US012355151B2

(12) United States Patent
Yoo

(10) Patent No.: US 12,355,151 B2
(45) Date of Patent: Jul. 8, 2025

(54) ANTENNA STRUCTURE WITH REDUCED ANGLE ERROR

(71) Applicant: HJWAVE Co., Ltd., Incheon (KR)

(72) Inventor: Tae Hwan Yoo, Incheon (KR)

( * ) Notice: Subject to any disclaimer, the term of this patent is extended or adjusted under 35 U.S.C. 154(b) by 145 days.

(21) Appl. No.: 17/987,942

(22) Filed: Nov. 16, 2022

(65) Prior Publication Data

US 2023/0083196 A1 Mar. 16, 2023

Related U.S. Application Data

(63) Continuation-in-part of application No. 17/741,225, filed on May 10, 2022, now Pat. No. 11,749,884.

(30) Foreign Application Priority Data

May 17, 2021 (KR) ........................ 10-2021-0063506
May 17, 2021 (KR) ........................ 10-2021-0063674
Jul. 30, 2021 (KR) ........................ 10-2021-0100845
Nov. 2, 2021 (KR) ........................ 10-2021-0148966

(51) Int. Cl.
*H01Q 1/22* (2006.01)
*H01Q 13/10* (2006.01)

(52) U.S. Cl.
CPC ......... *H01Q 13/106* (2013.01); *H01Q 1/2283* (2013.01)

(58) Field of Classification Search
CPC ........ H01Q 1/38; H01Q 1/2283; H01Q 13/10; H01Q 13/18
See application file for complete search history.

(56) References Cited

U.S. PATENT DOCUMENTS 7,079,079 B2 * 7/2006 Jo ........................ H01Q 9/0442 343/702
8,040,286 B2 * 10/2011 Matsuo ..................... H01P 5/02 343/771
2006/0132374 A1 6/2006 Wang
2016/0126636 A1 * 5/2016 Uemichi ............ H01Q 21/0043 343/771
2018/0351261 A1 12/2018 Kamo et al.
2020/0136225 A1 4/2020 Shi
2020/0220273 A1 * 7/2020 Ahmadloo ......... H01Q 21/0043

FOREIGN PATENT DOCUMENTS

EP 2249437 A1 11/2010
KR 10-0964623 6/2010

OTHER PUBLICATIONS

English Specification of EP2249437A1.
English Specification of 10-0964623.

* cited by examiner

*Primary Examiner* — Hasan Islam
(74) *Attorney, Agent, or Firm* — ANTONIO HA & U.S. PATENT, LLC

(57) ABSTRACT

According to an embodiment, an antenna structure comprises a printed circuit board including an integrated circuit processing a radio frequency (RF) signal, a feeding line connected to the integrated circuit, and a feeding pad connected to the feeding line to transfer the RF signal and a conductive upper layer including an antenna slot pattern connected with the feeding pad through a waveguide and vertically opened to radiate or receive the RF signal. The conductive upper layer further includes an adjacent slot pattern around the antenna slot pattern.

6 Claims, 31 Drawing Sheets

| -10dB ReturnLoss BW(GHz) | 76.37~81.70(5.33GHz) | | | | | |
|---|---|---|---|---|---|---|
| Frequency(GHz) | 76 | 77 | 78 | 79 | 80 | 81 |
| Peak Gain(dBi) | 9.88 | 10.73 | 11.01 | 11.02 | 10.89 | 10.42 |
| Az 10dB BW(deg) | 125.91 | 125.18 | 124.48 | 123.85 | 123.30 | 122.88 |

| -10dB ReturnLoss BW(GHz) | 75.07~77.44(2.37GHz) | | | | | |
|---|---|---|---|---|---|---|
| Frequency(GHz) | 76 | 77 | 78 | 79 | 80 | 81 |
| Peak Gain(dBi) | 13.58 | 13.46 | 12.08 | 10.23 | 9.19 | 10.16 |
| Az 10dB BW(deg) | 146.29 | 145.33 | 147.12 | 146.54 | 145.71 | 146.05 |

| -10dB ReturnLoss BW(GHz) | 76.37~81.70(5.33GHz) | | | | | |
|---|---|---|---|---|---|---|
| Frequency(GHz) | 76 | 77 | 78 | 79 | 80 | 81 |
| Peak Gain(dBi) | 9.88 | 10.73 | 11.01 | 11.02 | 10.89 | 10.42 |
| Az 10dB BW(deg) | 125.91 | 125.18 | 124.48 | 123.85 | 123.30 | 122.88 |

| | Hollow waveguide (conventional rectangular waveguide) | Protruding waveguide |
|---|---|---|
| Structure |  |  |

ANTENNA STRUCTURE WITH REDUCED ANGLE ERROR

CROSS-REFERENCE TO RELATED APPLICATIONS

This application is a continuation-in-part of U.S. patent application Ser. No. 17/741,225, filed on May 10, 2022 which claims priority under 35 U.S.C. 119 to Korean Patent Application Nos. 10-2021-0063506, 10-2021-0063674, 10-2021-0100845, and 10-2021-0148966, respectively filed on May 17, 2021, May 17, 2021, Jul. 30, 2021, and Nov. 2, 2021, in the Korean Intellectual Property Office, the disclosures of which are herein incorporated by reference in their entireties.

TECHNICAL FIELD

The disclosure relates to a structure for reducing an angle error and, more specifically, to an antenna structure with an angle error mitigating structure for enhancing angular resolution in vehicle radars that are used to prevent accident and implement autonomous driving by detecting, e.g., the distance, speed, or angle from an object around the vehicle equipped with the vehicle radar.

DESCRIPTION OF RELATED ART

Corner radars for future vehicles require wide-angle characteristics (e.g., azimuth field of view of 150 degrees or more) for object detection at intersections, a high resolution for detecting small objects, and a wide bandwidth (e.g., a bandwidth of 5 GHz or higher). To meet these requirements, the antenna itself should meet both the wide-angle and wide-band characteristics. However, currently commercially available antennas for vehicles do not meet both the wide-angle and wide-band characteristics but only meet either the wide-angle characteristics or the wide-band characteristics.

Meanwhile, vehicle radar is used for accident prevention and autonomous driving by detecting the distance, speed and angle of objects around the radar-equipped vehicle. The vehicle radar needs to ensure more accurate detection of the position (angle) of an object in a longer distance and is especially important for high angular resolution of 4-dimensional (4D) image radar in the future.

The description disclosed in the Background section is only for a better understanding of the background of the disclosure and may also include information which does not constitute the prior art.

SUMMARY

According to an embodiment of the disclosure, there is provided an antenna structure with a reduced angle error to increase the accuracy of detecting the angle of an object by the vehicle radar.

According to an embodiment, an antenna structure comprises a printed circuit board including an integrated circuit processing a radio frequency (RF) signal, a feeding line connected to the integrated circuit, and a feeding pad connected to the feeding line to transfer the RF signal and a conductive upper layer including an antenna slot pattern connected with the feeding pad through a waveguide and vertically opened to radiate or receive the RF signal. The conductive upper layer further includes an adjacent slot pattern around the antenna slot pattern.

The antenna structure may further comprise a conductive lower layer disposed between the printed circuit board and the conductive upper layer, including a feeding hole provided in an area connected with the feeding pad of the printed circuit board and vertically opened and a waveguide connected to the feeding hole and disposed on the feeding hole, and tightly contacting between the printed circuit board and the conductive upper layer.

The adjacent slot pattern has a depth (or height) of ¼ of a wavelength of the RF signal.

The adjacent slot pattern may include a through hole or a blind hole formed vertically.

The adjacent slot pattern may include a plurality of slot arrays.

The adjacent slot pattern may have a depth (or height) of 0.5 mm to 1.5 mm and a width and interval of 0.5 mm to 2 mm.

The waveguide of the conductive lower layer may include a bottom surface positioned lower than an upper surface thereof, a side surface extending from each of two opposite ends of the bottom surface to the upper surface, and a protrusion protruding upward from a center portion of the bottom surface.

The overall length along the bottom surface and the outer circumference of the protrusion may be half the wavelength of the RF signal, or more.

The height of the protrusion may be larger than the width of the protrusion and be larger than half the depth of the side surface.

Each of the conductive upper layer and the conductive lower layer may include an insulating body formed by plastic injection molding and a conductive layer coated on a surface of the insulating body.

The antenna slot pattern of the conductive upper layer may include a row of slot array disposed at an upper portion of the conductive lower layer. The conductive upper layer may further include a protruding rib on a side of the row of slot array on the upper surface thereof.

The printed circuit board, the conductive lower layer, and the conductive upper layer may be coupled to each other by fitting a guide protrusion into a guide hole. The printed circuit board, the conductive lower layer, and the conductive upper layer each may include a rivet hole into which a rivet is inserted and are coupled to each other by riveting.

The antenna slot pattern of the conductive upper layer may include at least two rows of slot arrays. The at least two rows of slot arrays may include a first row of slot array and a second row of slot array which have different slot lengths, or slots in the at least two rows of slot arrays may be arranged in a zig-zagged pattern.

The conductive upper layer may further include a protruding rib on a side of the row of slot array on the upper surface thereof.

According to the disclosure, it is possible to provide an antenna structure capable of reducing an angle error in a detected object by providing an angle error mitigating structure adopting a gain deviation mitigating structure for each antenna port to enhance angular resolution.

BRIEF DESCRIPTION OF THE DRAWINGS

More complete appreciation of the disclosure and many of the attendant aspects thereof will be readily obtained as the same becomes better understood by reference to the following detailed description when considered in connection with the accompanying drawings, wherein.

DETAILED DESCRIPTION

Figure 1:
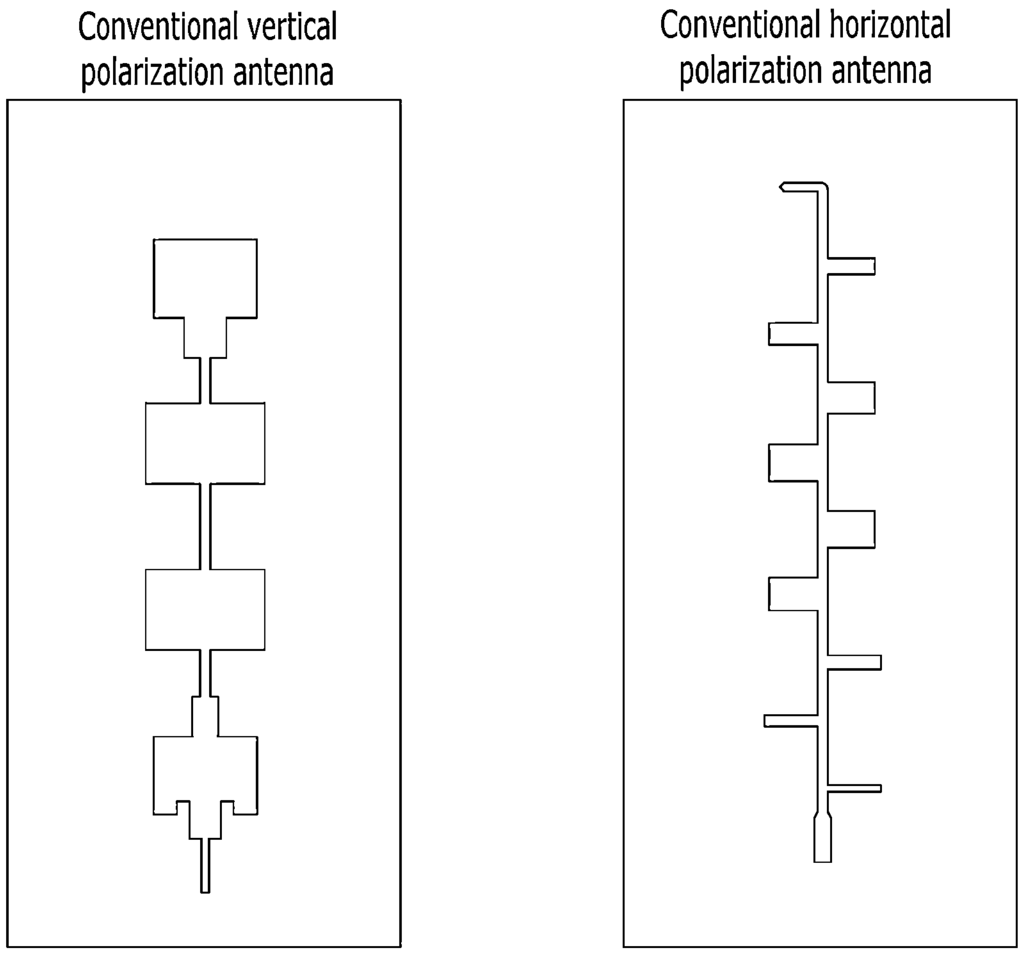
FIG. 1 PRIOR ART
FIG. 1 is a view illustrating a vertical polarization antenna and a horizontal polarization antenna according to the prior art.

Hereinafter, embodiments of the disclosure are described in detail with reference to the accompanying drawings.

Embodiments of the disclosure are provided to thoroughly explain the disclosure to those skilled in the art, and various modifications may be made thereto, and the scope of the disclosure is not limited thereto. Embodiments of the disclosure are provided to fully and thoroughly convey the spirit of the disclosure to those skilled in the art.

As used herein, the thickness and size of each layer may be exaggerated for ease or clarity of description. The same reference denotations may be used to refer to the same or substantially the same elements throughout the specification and the drawings. As used herein, the term "A and/or B" encompasses any, or one or more combinations, of A and B. It will be understood that when an element or layer is referred to as being "on," "connected to," "coupled to," or "adjacent to" another element or layer, it can be directly on, connected, coupled, or adjacent to the other element or layer, or intervening elements or layers may be present.

The terms as used herein are provided merely to describe some embodiments thereof, but not intended as limiting the disclosure. As used herein, the singular forms "a," "an," and "the" are intended to include the plural forms as well, unless the context clearly indicates otherwise. As used herein, the term "comprise," "include," and/or "comprising" or "including" does not exclude the presence or addition of one or more other components, steps, operations, and/or elements than the component, step, operation, and/or element already mentioned.

As used herein, the terms "first" and "second" may be used to describe various members, parts, regions, areas, layers, and/or portions, but the members, parts, regions, areas, layers, and/or portions are not limited thereby. These terms are used merely to distinguish one member, part, region, area, layer, or portion from another. Accordingly, the term "first member," "first part," "first region," "first area," "first layer," or "first portion" described herein may denote a "second member," "second part," "second region," "second area," "second layer," or "second portion" without departing from the teachings disclosed herein.

The terms "beneath," "below," "lower," "under," "above," "upper," "on," or other terms to indicate a position or location may be used for a better understanding of the relation between an element or feature and another as shown in the drawings. However, embodiments of the disclosure are not limited thereby or thereto. For example, where a lower element or an element positioned under another element is overturned, then the element may be termed as an upper element or element positioned above the other element. Thus, the term "under" or "beneath" may encompass, in meaning, the term "above" or "over."

Figure 2:
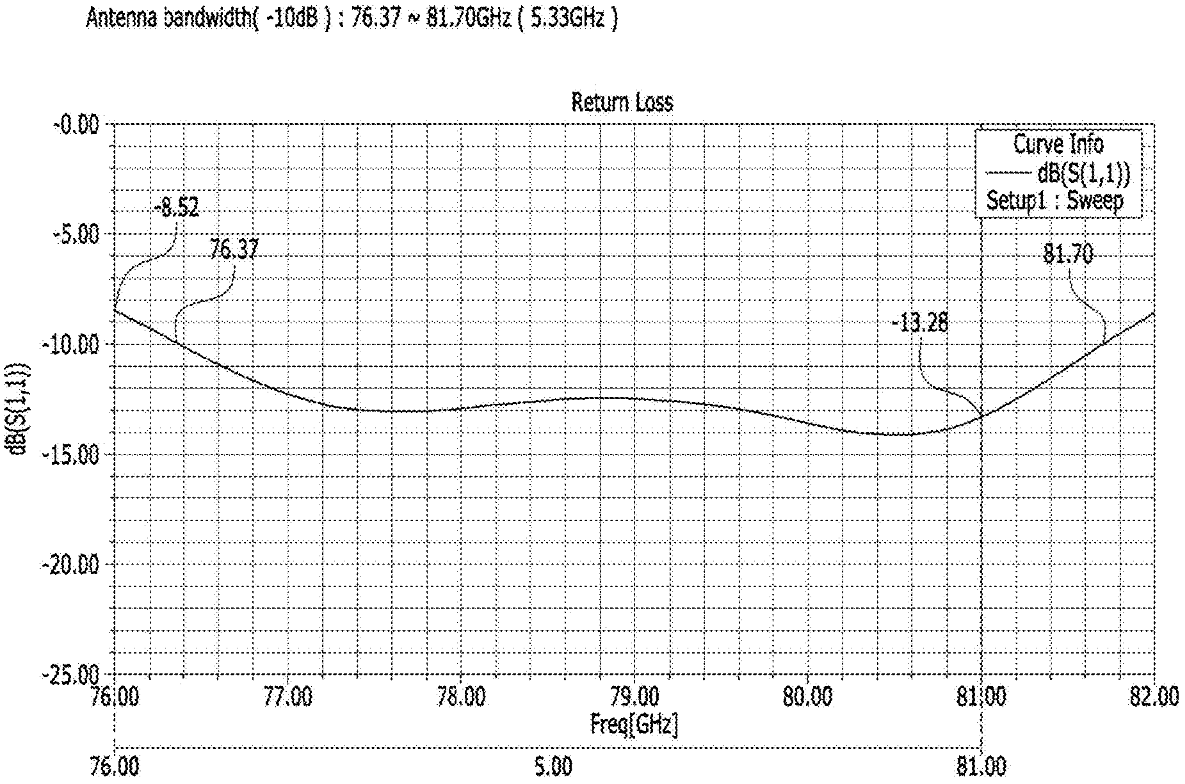
FIG. 2 PRIOR ART
FIG. 2 is a graph illustrating the bandwidth of the vertical polarization antenna of FIG. 1.
Figure 3:
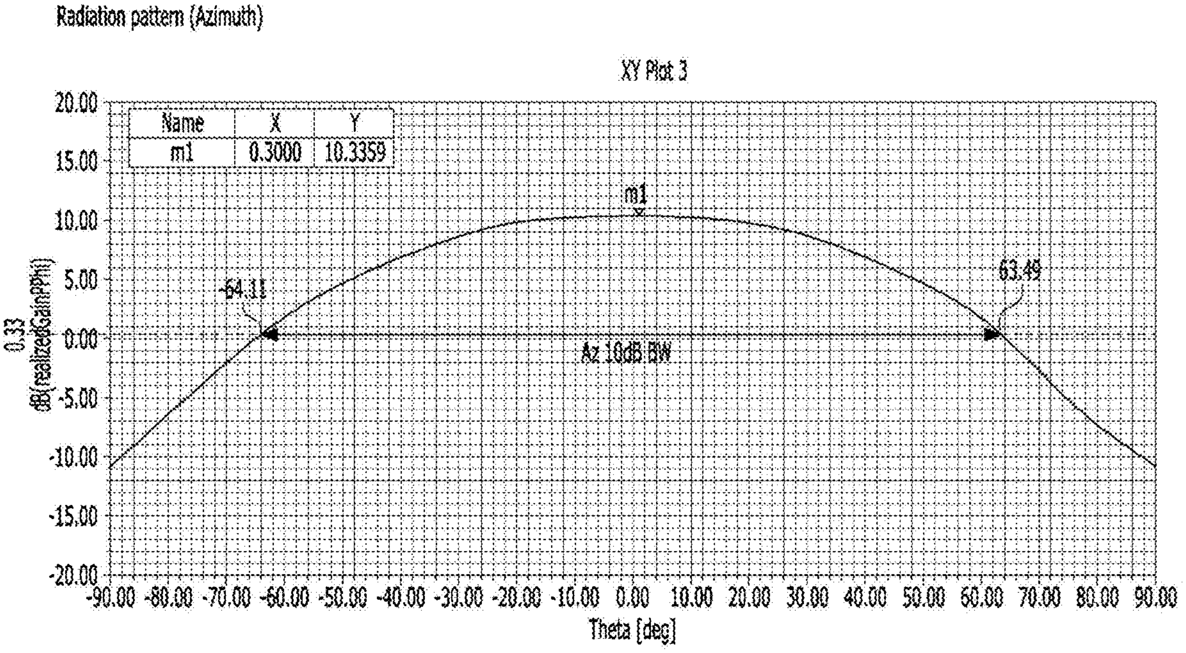
FIG. 3 PRIOR ART
FIG. 3 is a graph illustrating a radiation pattern of the vertical polarization antenna of FIG. 1.
Figure 4:
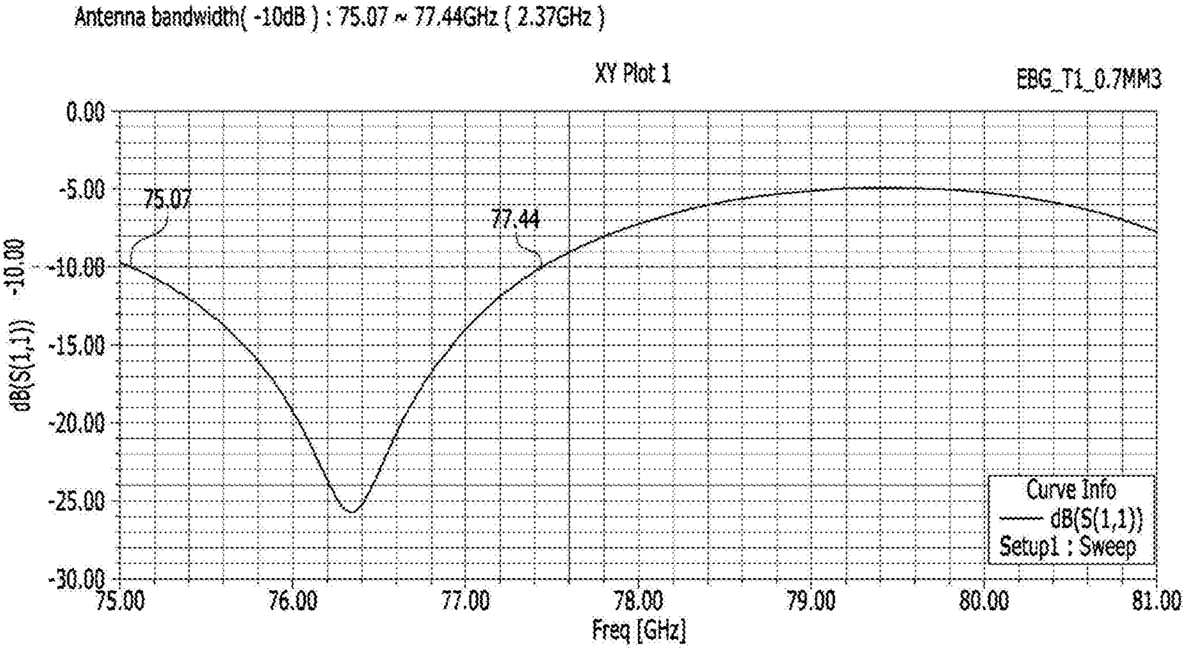
FIG. 4 PRIOR ART
FIG. 4 is a graph illustrating the bandwidth of the horizontal polarization antenna of FIG. 1.
Figure 5:
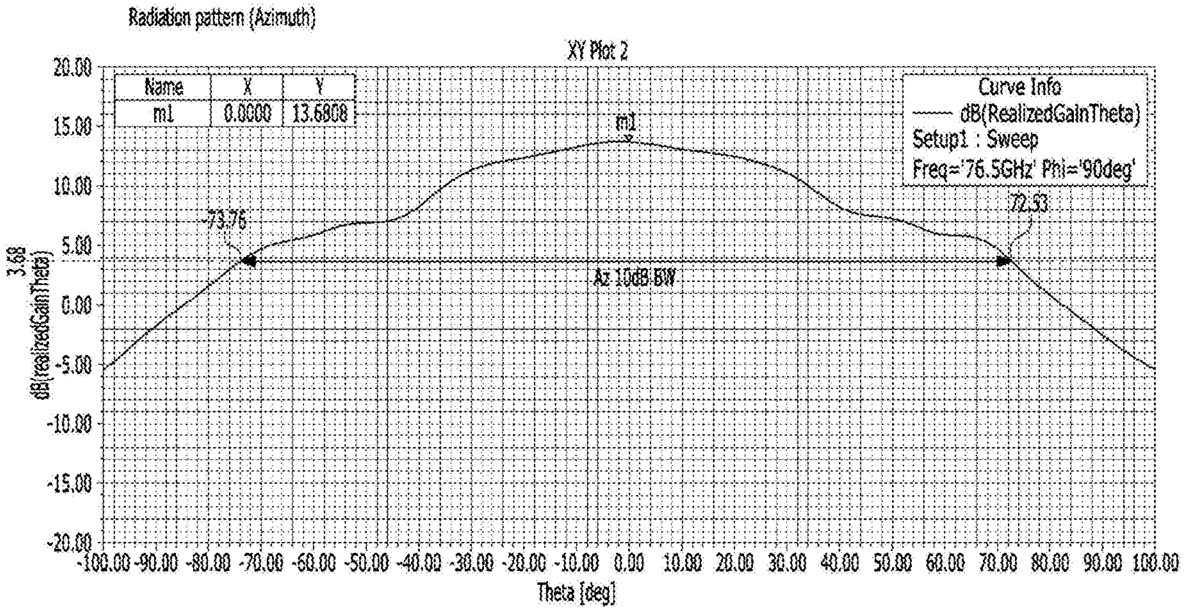
FIG. 5 PRIOR ART
FIG. 5 is a graph illustrating a radiation pattern of the horizontal polarization antenna of FIG. 1.

FIG. 1 is a view illustrating a vertical polarization antenna and a horizontal polarization antenna according to the prior art. FIG. 2 is a graph illustrating the bandwidth of the vertical polarization antenna of FIG. 1. FIG. 3 is a graph illustrating a radiation pattern of the vertical polarization antenna of FIG. 1. FIG. 4 is a graph illustrating the bandwidth of the horizontal polarization antenna of FIG. 1. FIG. 5 is a graph illustrating a radiation pattern of the horizontal polarization antenna of FIG. 1.

Referring to FIGS. 2 and 3, it may be identified that with a conventional serial direct feeding vertical polarization antenna (shown on the left side of FIG. 1), wide-band characteristics may be implemented, but the wide-angle characteristics (150 degrees or more) are not as the AZ 10 dB bandwidth (BW) is about 125 degrees.

It may also be identified from FIGS. 4 and 5 that the conventional serial direct feeding horizontal polarization antenna (shown on the right side of FIG. 1) has about 146 degrees of AZ 10 dB BW, which fails to meet the requirement, 150 degrees, for corner radars, and an antenna bandwidth of about 2.4 GHz, and with it, it is difficult to implement the wide-angle characteristics and wide-band characteristics (requiring 5 GHz or more).

In general, antennas for vehicle corner radars require a wide-angle characteristic of about 150 degrees or more, but conventional vertical/horizontal polarization antennas currently adopted in vehicle radars have difficulty in implementing such wide-angle characteristic.

Figure 6:
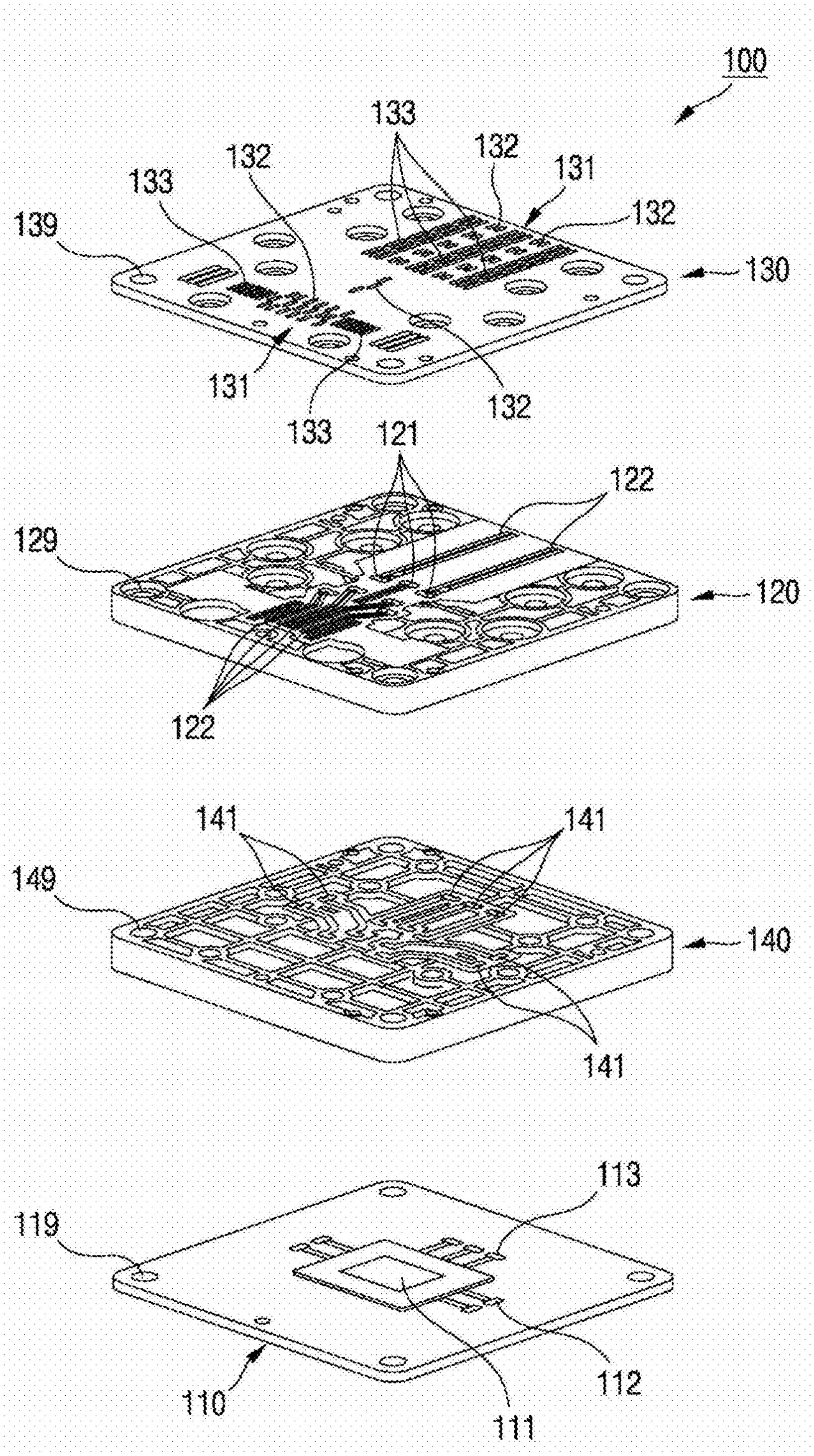
FIG. 6 is a view illustrating an example of an antenna structure according to an embodiment.

FIG. 6 is a view illustrating an example of an antenna structure 100 according to an embodiment. Referring to FIG. 6, according to an embodiment, an antenna structure 100 may include a printed circuit board 110 and a conductive upper layer 130 and may further include a conductive lower layer 120. According to an embodiment, the antenna structure 100 may further include a conductive sub layer 140.

According to an embodiment, the antenna structure 100 may be implemented with the printed circuit board 110 and the conductive upper layer 130, or the antenna structure 100 may be implemented to further include the conductive lower layer 120 between the printed circuit board 110 and the conductive upper layer 130. Alternatively, the antenna structure 100 may be implemented to include all of the printed circuit board 110, the conductive lower layer 120, the conductive upper layer 130, and the conductive sub layer 140.

According to an embodiment, when the antenna structure 100 is implemented with the printed circuit board 110 and the conductive upper layer 130, the conductive upper layer 130 includes an antenna slot pattern 131 that is connected with a feeding pad(s) of the printed circuit board 110 through a waveguide(s) and is opened vertically to radiate or receive radio frequency (RF) signals. The antenna slot pattern 131 of the conductive upper layer 130 is connected with the feeding pad of the printed circuit board 110 through various propagation paths, such as waveguides or feeding holes, to transfer RF signals.

The printed circuit board 110 may have a substantially flat plate shape and may have an integrated circuit 111 for processing radio frequency (RF) signals thereon. The printed circuit board 110 may include feeding lines 112 electrically connected to the integrated circuit 111 and feeding pads 113 electrically connected to the feeding lines 112 to transmit or receive RF signals. According to an embodiment, the integrated circuit 111, the feeding lines 112, and the feeding pads 113 of the printed circuit board 110 may be coated with a metal. According to an embodiment, an area of the printed circuit board 110, which faces the conductive lower layer 120 and/or the conductive sub layer 140, may be coated with a metal to prevent transmission/reception loss of electromagnetic waves. According to an embodiment, the printed circuit board 110 may further include a plurality of rivet holes 119 for riveting. According to an embodiment, the printed circuit board 110 may include a radar board or may be denoted as a radar board.

The conductive lower layer 120 may have a substantially flat plate shape and may include feeding holes 121, which are provided in areas (where electromagnetic waves may be transmitted/received) connected with the feeding pads 113 of the printed circuit board 110 and are vertically open, and protruding waveguides 122 connected to the feeding holes 121 and disposed on the upper surface of the conductive lower layer 120. According to an embodiment, the protruding waveguide 122 includes a bottom surface 1221, a side surface 1222, and a protrusion 1223. According to an embodiment, at plan view, the feeding hole 121 may be shaped as a rectangle, a rectangle with rounded corners, or an oval, and the waveguide 122 may be shaped as a long straight line or a curved line. According to an embodiment, the conductive lower layer 120 may be brought in tight contact and fixed to the printed circuit board 110 by riveting and, to that end, may include a plurality of rivet holes 129. According to an embodiment, the conductive lower layer 120 may include, or be denoted as, an antenna feeder layer.

The conductive upper layer 130 may have a substantially flat plate shape and may include a plurality of antenna slot patterns 131 provided in areas corresponding to the waveguides 122 of the conductive lower layer 120 and vertically open to radiate or receive RF signals. According to an embodiment, the antenna slot pattern 131 may include a plurality of slots each shaped as a rectangle or a rectangle with rounded corners and arranged in one or more rows and/or a slot array 132. The terms "antenna slot pattern 131," "antenna slot array 132," and "antenna slot" are interchangeably used herein, but all of them are used to refer to elements vertically passing through the conductive upper layer 130.

According to an embodiment, the conductive upper layer 130 may further include adjacent slot patterns 133, which are cut or open vertically, on sides of the slot arrays 132. According to an embodiment, the adjacent slot pattern 133 may include, or be denoted as, an angle error mitigating structure capable of mitigating ripples and angle errors. The angle mitigating structure may mitigate or reduce angle errors to enhance angular resolution in vehicle radars that are used to prevent accident and implement autonomous driving by detecting, e.g., the distance, speed, or angle from an object around the vehicle equipped with the vehicle radar. In other words, the angle error mitigating structure may enhance angle errors in the detected object by mitigating or reducing angle errors to enhance angular resolution.

According to an embodiment, the conductive upper layer 130 may be riveted to the conductive lower layer 120 and/or the printed circuit board 110 to be brought in tight contact with or fixed to the conductive lower layer 120 and/or the printed circuit board 110. To that end, the conductive upper layer 130 may include a plurality of rivet holes 139. According to an embodiment, the conductive upper layer 130 may include, or be denoted as, an antenna slot layer or an antenna radiator.

The optional conductive sub layer 140 may have a substantially flat plate shape and be interposed between the printed circuit board 110 and the conductive lower layer 120 to transition electromagnetic waves between the printed circuit board 110 and the conductive lower layer 120. According to an embodiment, the conductive sub layer 140 may include RF signal paths, e.g., feeding holes 141, provided between the feeding pads 113 of the printed circuit board 110 and the feeding holes 121 of the conductive lower layer 120. At plan view, the RF signal path may be shaped as a rectangle, a rectangle with rounded corners, or an oval. According to an embodiment, the conductive sub layer 140 may include a plurality of rivet holes 149 to be riveted with the conductive lower layer 120, the conductive upper layer 130, and the printed circuit board 110 to be brought in tight contact with or fixed to the conductive lower layer 120, the conductive upper layer 130, and the printed circuit board 110. According to an embodiment, the conductive sub layer 140 may include, or be denoted as, an antenna feeder layer or a printed circuit board connector.

According to an embodiment, the conductive lower layer 120, the conductive upper layer 130, and the conductive sub layer 140 may include an insulating body (not shown), which is be formed or molded by plastic injection molding, and a conductive layer (not shown) coated on the surface of the insulating body. The insulating body may be a thermosetting or thermoplastic resin, and the conductive layer may include at least one or an alloy of copper, gold, platinum, silver, aluminum, or nickel. According to an embodiment, the conductive layer may be formed on any surface, which contacts the external air, such as the upper surface, lower surface, side surface, waveguide, feeding hole, and/or rivet hole, of each of the conductive lower layer 120, the conductive upper layer 130, and the conductive sub layer 140.

Thus, the antenna structure 100 according to an embodiment may implement both the wide-angle characteristic/wide-band characteristic appropriate for next-generation vehicle corner radars, and its specific characteristics are described below in greater detail.

Figure 7A:
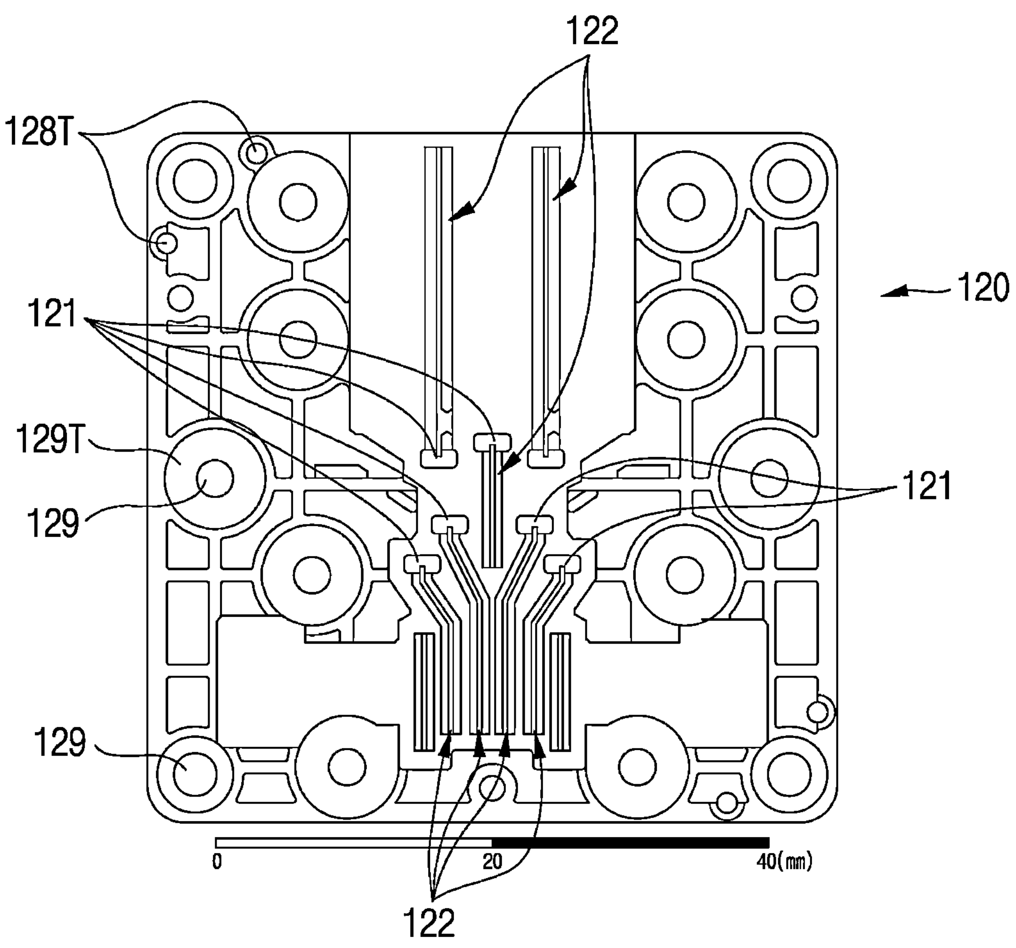
FIGS. 7A and 7B are a top view and bottom view illustrating a conductive lower layer of an antenna structure according to an embodiment.
Figure 7B:
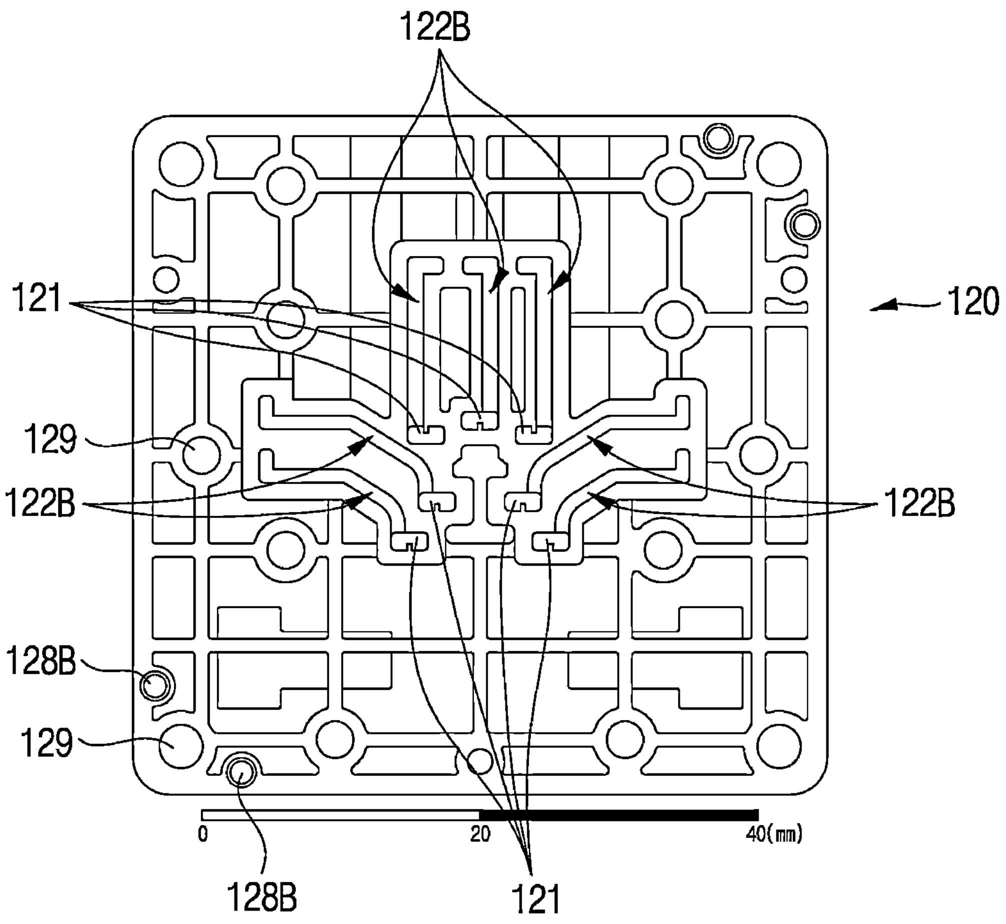

FIGS. 7A and 7B are a top view and bottom view illustrating a conductive lower layer 120 of an antenna structure 100 according to an embodiment.

Referring to FIGS. 7A and 7B, according to an embodiment, the conductive lower layer 120 of the antenna structure 100 may have a substantially flat upper surface and a substantially flat lower surface and may include waveguides 122 on the upper surface and waveguides 122B on the lower surface. The waveguides 122 on the upper surface and the waveguides 122B on the lower surface may be connected to each other through the feeding holes 121. According to an embodiment, the waveguide 122 on the upper surface of the conductive lower layer 120 may include a bottom surface 1221, which is positioned lower than the upper surface, side surfaces 1222, which are connected from two opposite ends of the bottom surface 1221 to the upper surface, and a protrusion 1223, which projects upward from a center of the bottom surface 1221. According to an embodiment, the waveguide 122B on the lower surface of the conductive lower layer 120 may include no protrusion 1223.

According to an embodiment, two transmission waveguides 122 may be formed in an upper area on the upper surface of the conductive lower layer 120, one transmission waveguide 122 may be formed in a central area on the upper surface of the conductive lower layer 120, and four reception waveguides 122 may be formed in a lower area on the upper surface of the conductive lower layer 120. As described above, the three transmission waveguides 122 and the four reception waveguides 122 all may be protruding waveguides 122 and may have a straight line or curved line shape with a predetermined length.

According to an embodiment, three transmission waveguides 122B may be formed in an upper area on the lower surface of the conductive lower layer 120, and four reception waveguides 122B may be formed in a center area and side areas on the lower surface of the conductive lower layer 120.

As described above, the waveguide 122 on the upper surface may be connected with the waveguide 122B on the lower surface, through the feeding hole 121.

According to an embodiment, the conductive lower layer 120 may include a plurality of rivet holes 129 passing through the upper and lower surfaces thereof. According to an embodiment, the conductive lower layer 120 may include a plurality of guide protrusions 128T formed on the upper surface thereof and a plurality of guide holes 128B passing through the upper and lower surfaces thereof. According to an embodiment, the conductive lower layer 120 may further include guide recesses 129T around the rivet holes 129. The guide recess 129T may be larger in diameter than the rivet hole 129.

The guide protrusion 148T of the conductive sub layer 140 may be fitted into the guide hole 128B of the conductive lower layer 120, the guide protrusion 128T of the conductive lower layer 120 may be fitted into the guide hole 138B of the conductive upper layer 130, and the guide protrusion 148T of the conductive upper layer 130 may be fitted into the guide recess 129T of the conductive lower layer 120.

Figure 8A:
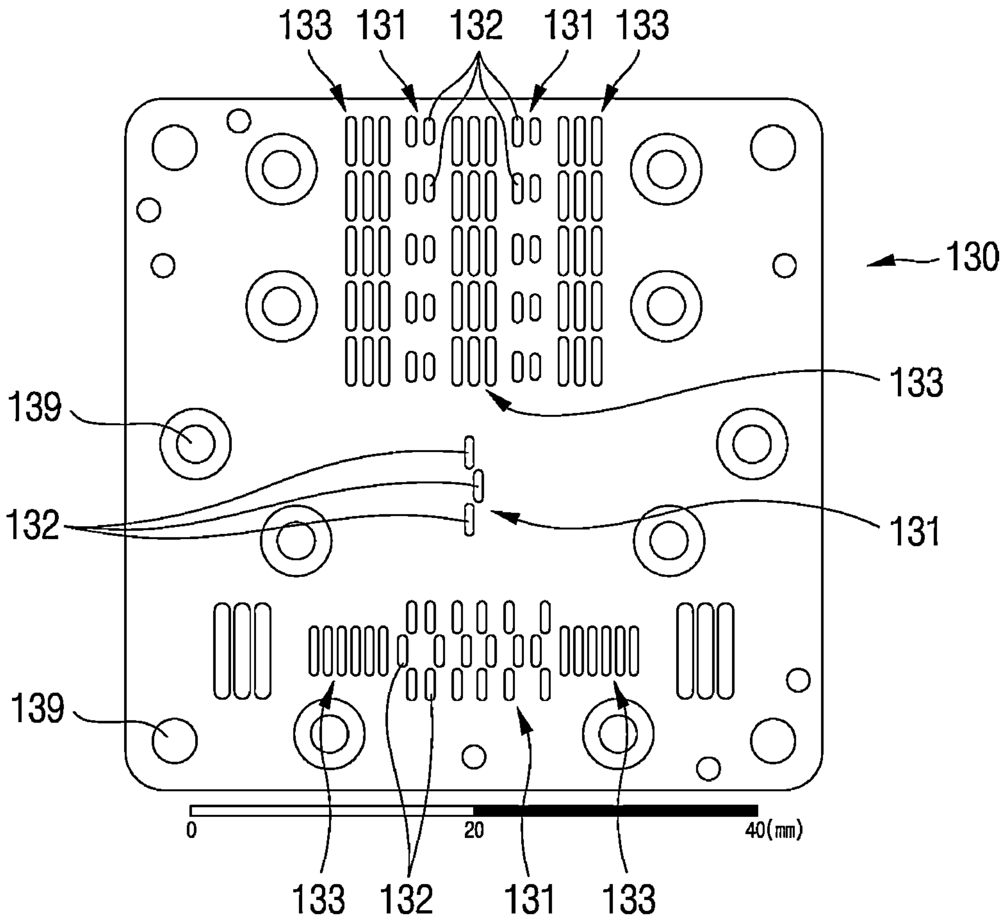
FIGS. 8A and 8B are a top view and bottom view illustrating a conductive upper layer of an antenna structure according to an embodiment.
Figure 8B:
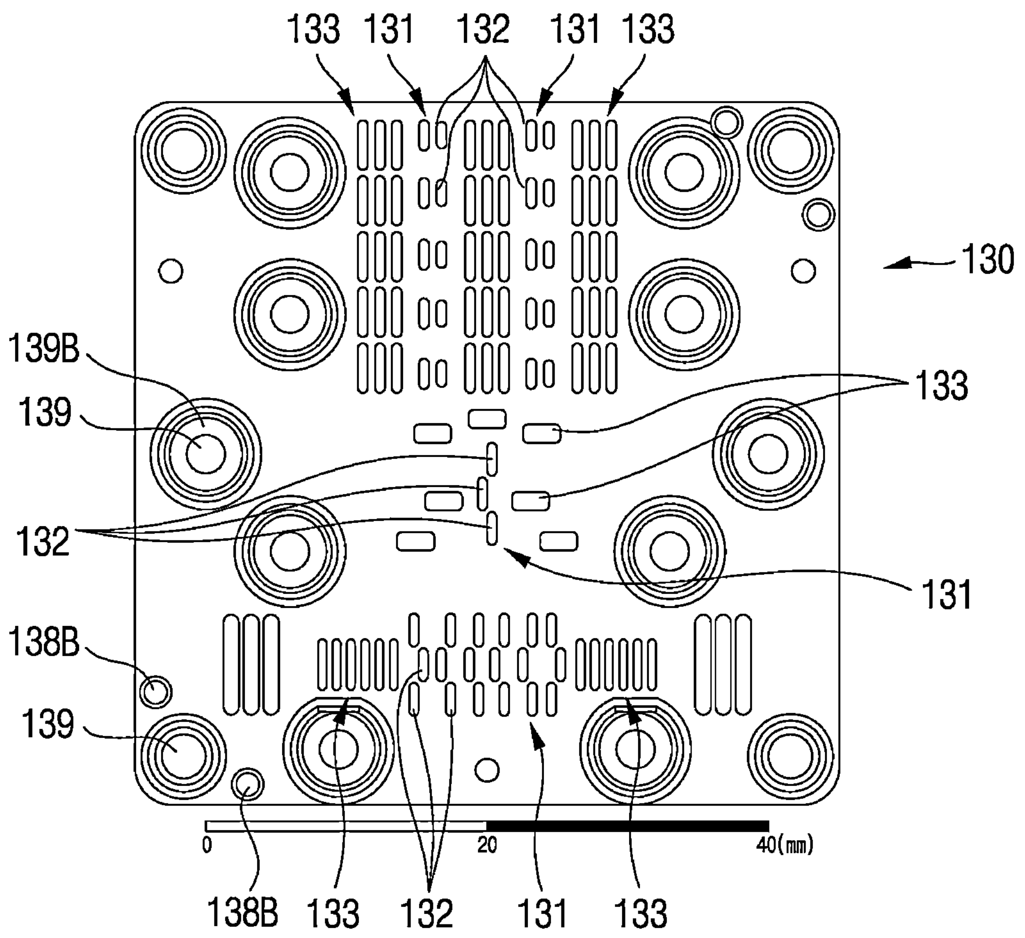

FIGS. 8A and 8B are a top view and bottom view illustrating a conductive upper layer 130 of an antenna structure 100 according to an embodiment.

Referring to FIGS. 8A and 8B, according to an embodiment, the conductive upper layer 130 of the antenna structure 100 may have a substantially flat upper surface and a substantially flat lower surface and may include a plurality of antenna slot patterns 131 and/or a plurality of antenna slot arrays 132 vertically passing through the upper surface and lower surface thereof.

According to an embodiment, the antenna slot pattern 131 may include two slot arrays 132 arranged in two rows, in an upper area of the conductive upper layer 130 and one slot array 132 arranged in one row, in a center area of the conductive upper layer 130. According to an embodiment, the two slot arrays 132 and one slot array 132 each may be formed in an area corresponding to the protruding waveguide 122 formed on the conductive lower layer 120.

According to an embodiment, the conductive upper layer 130 may further include adjacent slot patterns, which are formed by vertically cutting or passing through the conductive upper layer 130, between the two slot arrays 132 and on the respective outer sides of the two slot arrays 132. According to an embodiment, the adjacent slot pattern 133 may include or, be denoted as, an angle error mitigating structure, and may mitigate ripples or angle errors. According to an embodiment, the conductive upper layer 130 may further include one zig-zagged slot array 132 and adjacent slot patterns 133 on the outer sides of the zig-zagged slot array 132 on the lower surface of the conductive upper layer 130 as shown in FIG. 8B.

According to an embodiment, the slots in the two rows of slot arrays 132 may have different lengths. It is possible to enhance the beam tilting performance by forming the slots in the two rows of slot arrays 132 to have different lengths.

According to an embodiment, the antenna slot pattern 131 may further include a plurality of slot arrays 132 arranged in multiple rows in a lower area of the conductive upper layer 130.

According to an embodiment, the plurality of slot arrays 132 each may be formed in an area corresponding to the protruding waveguide 122 formed in the conductive lower layer 120.

According to an embodiment, the plurality of slot arrays 132 arranged in the multiple rows may be arranged in a zig-zagged pattern. For example, the slots arranged in the zig-zagged pattern may have the same length.

According to an embodiment, the conductive upper layer 130 may further include adjacent slot patterns 133, which are formed by vertically cutting or passing through the conductive upper layer 130, on the respective outer sides of the multiple slot arrays 132.

According to an embodiment, the conductive upper layer 130 may be thinner than the conductive lower layer 120. The conductive upper layer 130 may be formed to cover the conductive lower layer 120.

The conductive upper layer 130 may include a plurality of rivet holes 139 and may further include guide holes 138B into which the guide protrusions 128T of the conductive lower layer 120 are fitted and guide protrusions 139B fitted into the guide recesses 129T of the conductive lower layer 120.

Figure 9A:
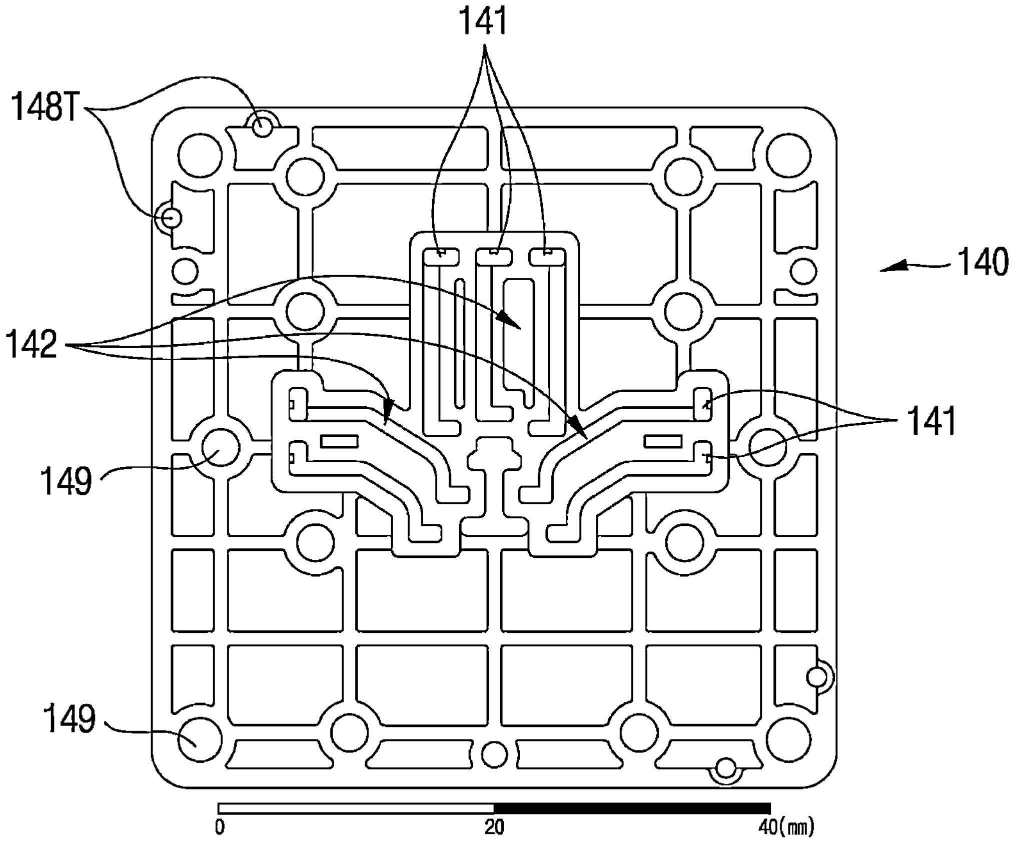
FIGS. 9A and 9B are a top view and bottom view illustrating a conductive sub layer of an antenna structure according to an embodiment.
Figure 9B:
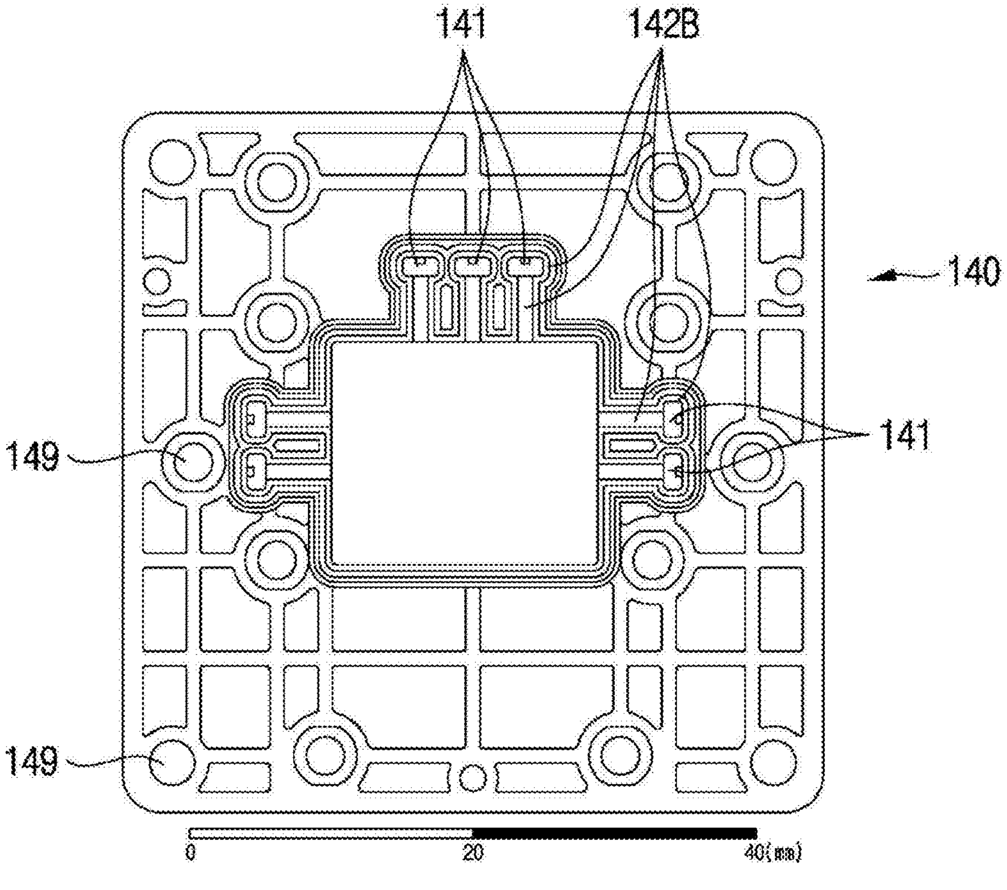

FIGS. 9A and 9B are a top view and bottom view illustrating a conductive sub layer 140 of an antenna structure 100 according to an embodiment.

Referring to FIGS. 9A and 9B, according to an embodiment, the conductive sub layer 140 of the antenna structure 100 may have a substantially flat upper surface and a substantially flat lower surface and may include waveguides 142 on the upper surface and paths 142B on the lower surface.

According to an embodiment, the waveguides 142 on the upper surface and the paths 142B on the lower surface may be connected through a plurality of feeding holes 141 or RF signal paths passing through the upper surface and lower surface.

According to an embodiment, the lower surface of the conductive sub layer 140 may include an area for receiving the RF integrated circuit 111 provided on the printed circuit board 110, an area for receiving the feeding line 112, and an area for receiving the feeding pad 113. The area for receiving the feeding line 112 and the area for receiving the feeding pad 113 may be denoted as paths 142B for convenience of description.

According to an embodiment, the feeding hole 141 of the conductive sub layer 140 may be provided in an area corresponding to the feeding pad 113 of the printed circuit board 110.

According to an embodiment, the conductive sub layer 140 may include a plurality of rivet holes 149 and may further include guide protrusions 148T fitted into the guide holes 128B formed in the conductive lower layer 120.

Thus, the conductive sub layer 140, the conductive lower layer 120, and the conductive upper layer 130 may be coupled to each other by the guide protrusions 148T, 128T, and 139B, the guide holes 128B and 138B, and the guide recesses 129T and be coupled to each other by riveting, e.g., inserting rivets 150 to the rivet holes 149, 139, 129, and 119. The printed circuit board 110 may also be riveted to the combined structure of the conductive sub layer 140, conductive lower layer 120, and conductive upper layer 130.

Figure 10:
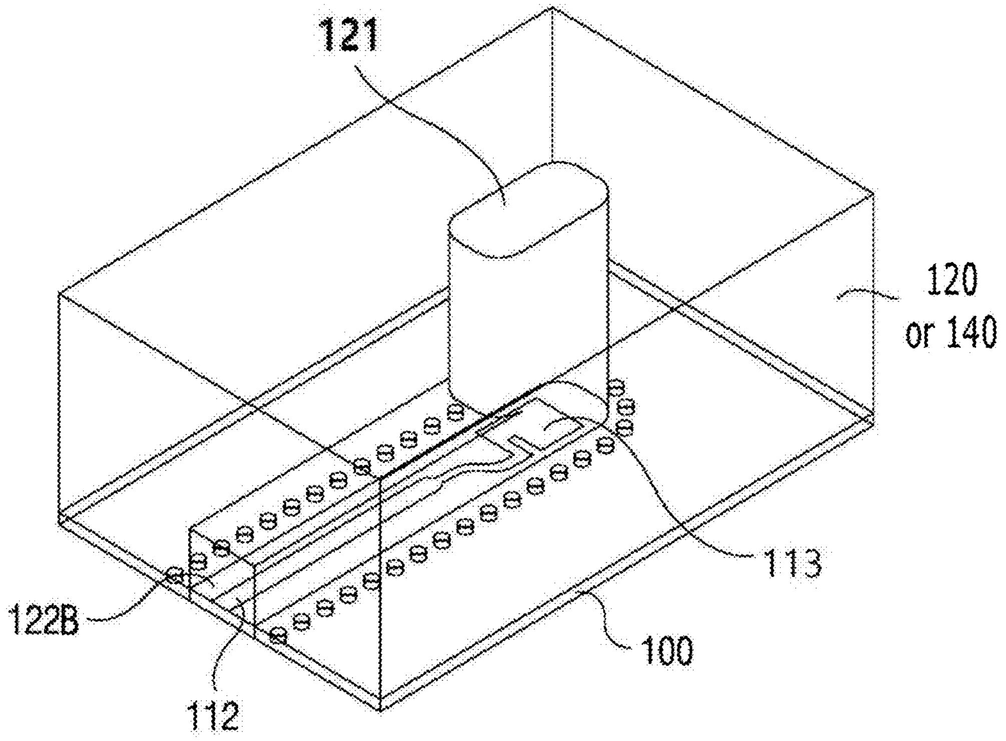
FIG. 10 is a partial perspective view illustrating a relationship between a printed circuit board and a conductive lower layer of an antenna structure according to an embodiment.

FIG. 10 is a partial perspective view illustrating a relationship between a printed circuit board 110 and a conductive lower layer 120 of an antenna structure 100 according to an embodiment.

According to an embodiment, the conductive lower layer 120 may be the conductive sub layer 140. Referring to FIG. 10, the feeding line 112 and the feeding pad 113 of the printed circuit board 110 may be elongated or extended to be relatively longer in the lengthwise direction thereof.

According to an embodiment, the feeding hole 121 of the conductive lower layer 120 (or conductive sub layer 140) may be elongated or extended to be relatively longer in the lengthwise direction thereof, similar to the feeding line 112 and the feeding pad 113.

The waveguide 122 (or path 142B) and the feeding hole 121 (or feeding hole 141) of the conductive lower layer 120 (or conductive sub layer 140) may be formed in the positions corresponding to the feeding line 112 and feeding pad 113, respectively, of the printed circuit board 110. According to an embodiment, this structure (e.g., the combined structure of the printed circuit board 110, the conductive upper layer 130, the conductive sub layer 140, and the conductive lower layer 120) may include, or be denoted as, a transition structure or an adapter.

Figure 11:
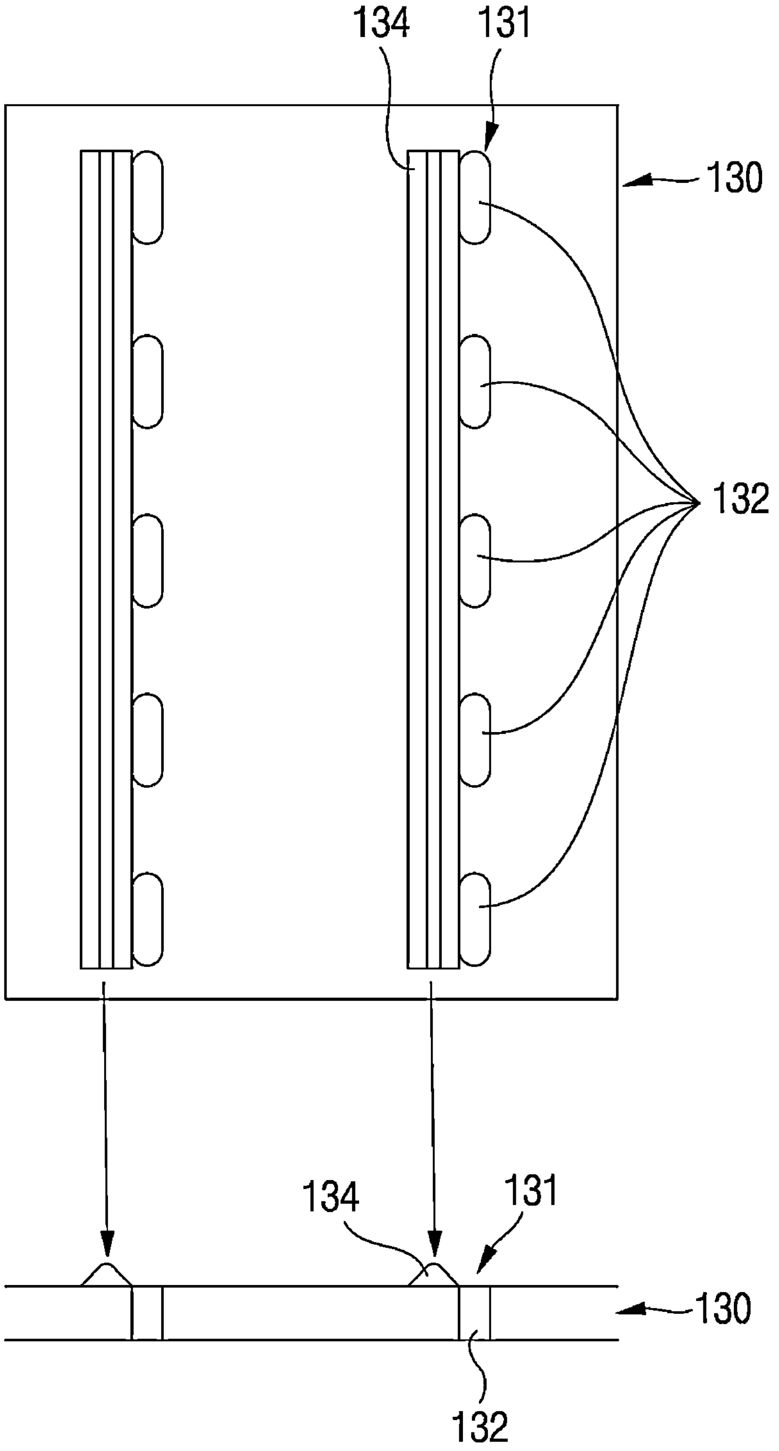
FIG. 11 is a plan view illustrating a conductive upper layer of an antenna structure according to an embodiment.

FIG. 11 is a plan view illustrating a conductive upper layer 130 of an antenna structure 100 according to an embodiment.

As shown in FIG. 11, the antenna slot pattern 131 of the conductive upper layer 130 may include a row of slot array 132 arranged above the protruding waveguide 122 of the conductive lower layer 120.

According to an embodiment, the conductive upper layer 130 may further include a protruding rib 134 on a side of the row of slot array 132 on the upper surface thereof. According to an embodiment, the protruding rib 134 may protrude by a predetermined height upward from the upper surface of the conductive upper layer 130. According to an embodiment, the protruding rib 134 may have a cross section shaped as a triangle, a rectangle, a trapezoid, a semicircle, or a semioval. The protruding rib 134 may tilt the beam, thereby providing a single array antenna structure without an additional divider.

Figure 12:
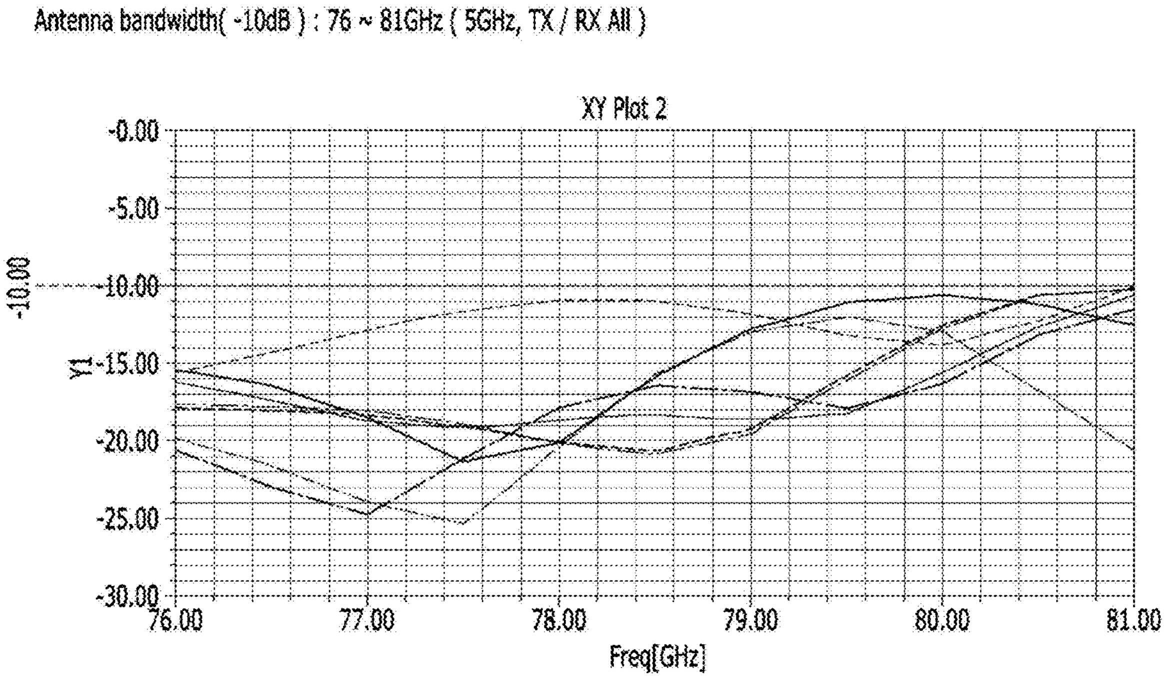
FIG. 12 is a graph illustrating the bandwidth of an antenna structure as illustrated in FIG. 6.
Figure 13:
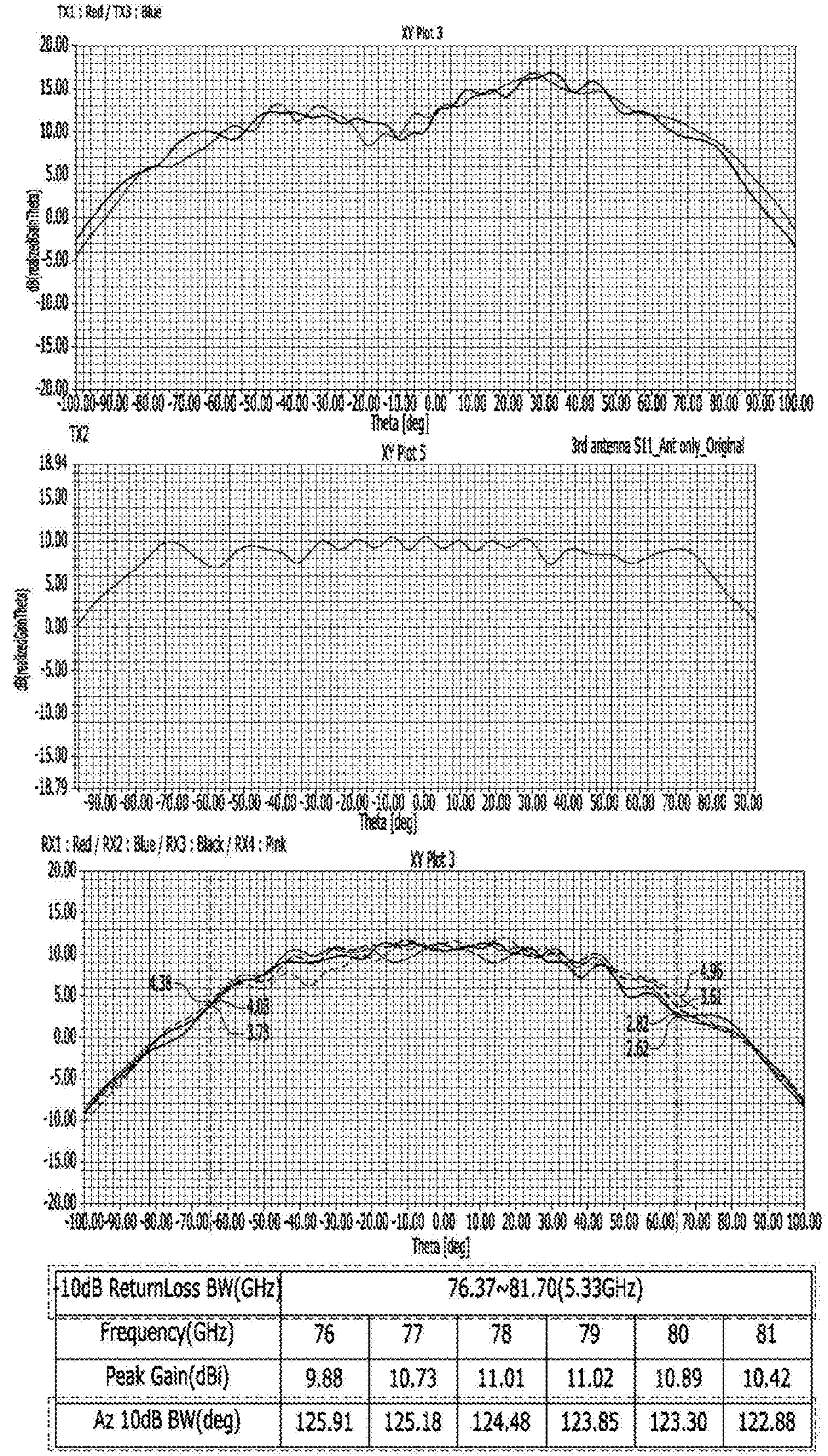
FIG. 13 is a graph illustrating a radiation pattern of an antenna structure as illustrated in FIG. 6.

FIG. 12 is a graph illustrating the bandwidth of an antenna structure 100 as illustrated in FIG. 6. FIG. 13 is a graph illustrating a radiation pattern of an antenna structure 100 as illustrated in FIG. 6.

Referring to FIGS. 12 and 13, according to an embodiment, the antenna structure 100 may operate in a range from about 76 GHz to about 81 GHz, e.g., a bandwidth of about 5 GHz, and the beam width of the antenna may be about 150 degrees or more. As such, the antenna structure 100 is able to implement both the wide-band characteristic and wide-angle characteristic and be applied to vehicle corner radars.

Figure 14A:
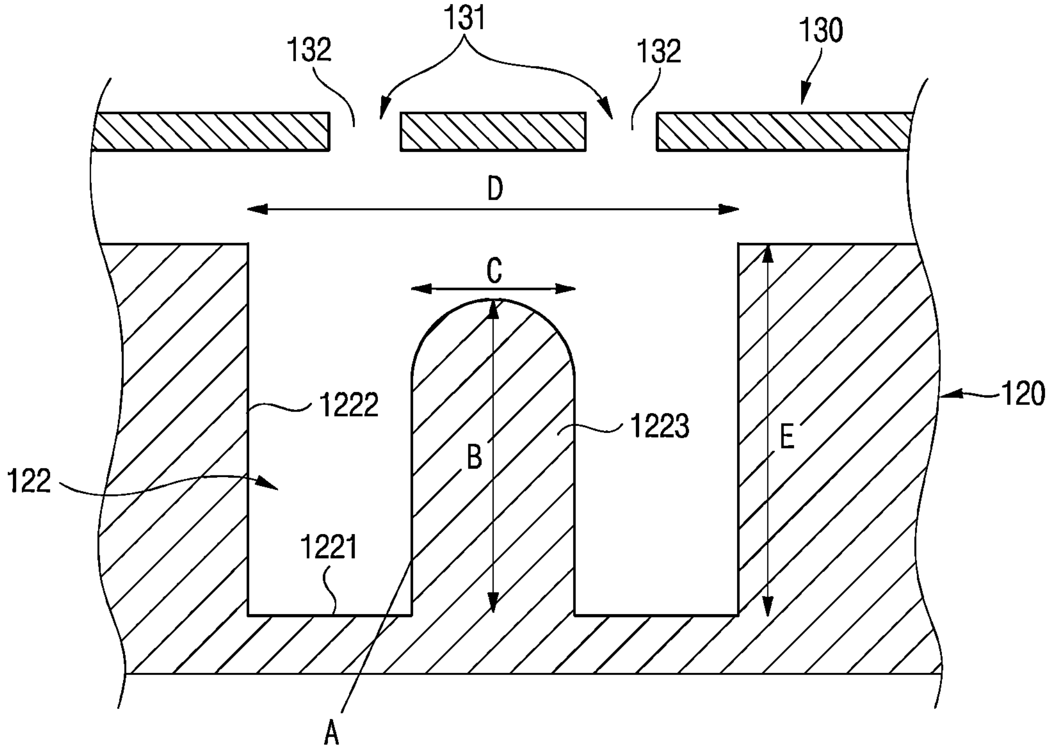
FIGS. 14A and 14B are views illustrating an example of a protruding waveguide having a protrusion, of an antenna structure as illustrated in FIG. 6.
Figure 14B:
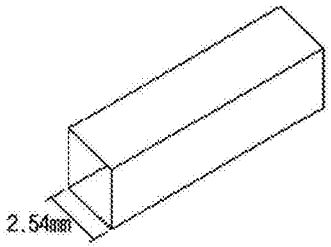
Figure 14B:
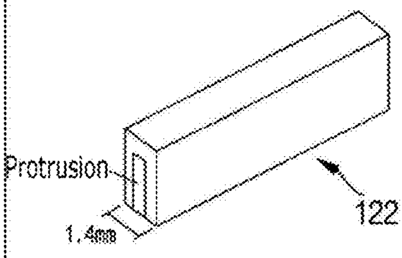
Figure 15:
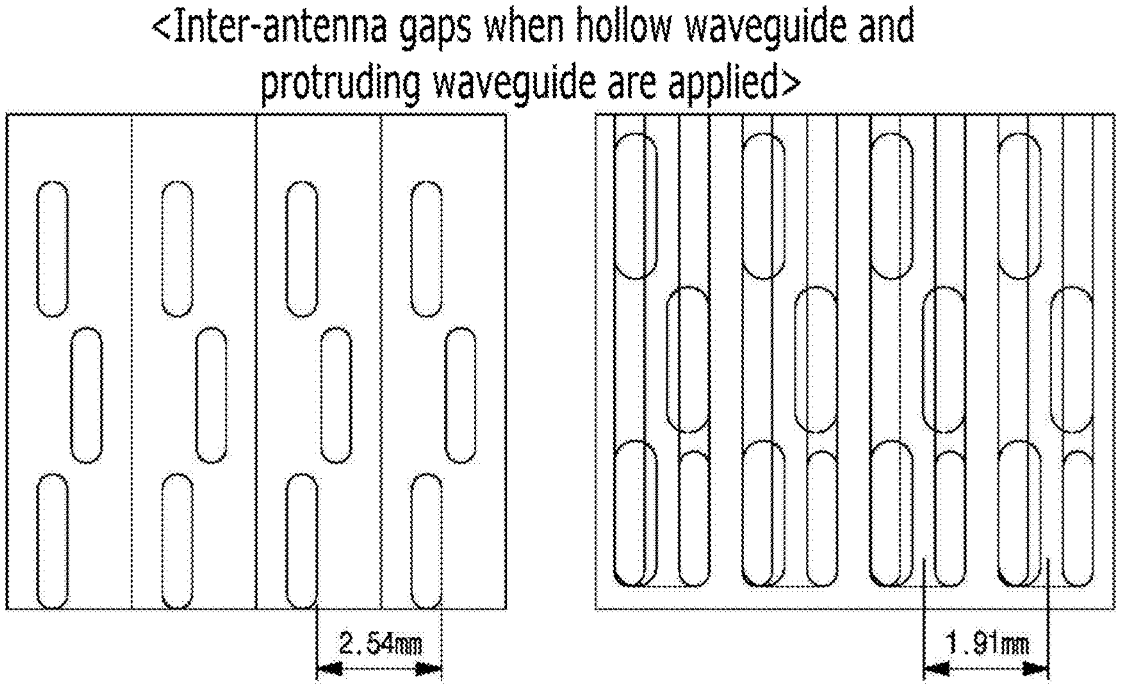
FIG. 15 is a view illustrating comparison in inter-antenna gap between when a hollow waveguide is applied and when a protruding waveguide is applied.
Figure 16:
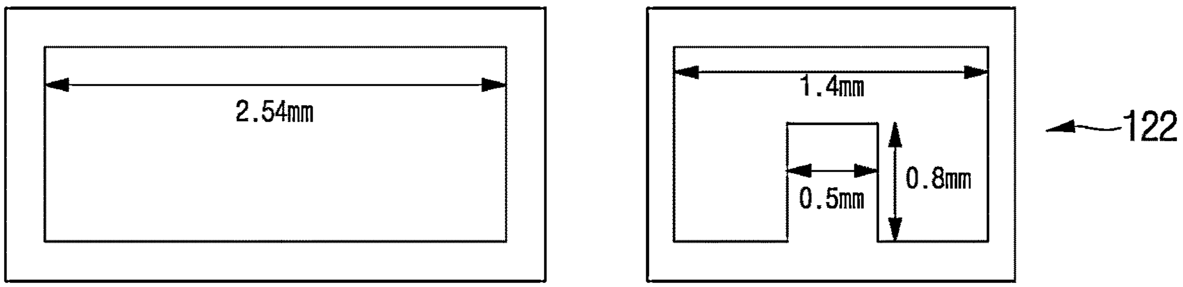
FIG. 16 is a cross-sectional view of FIG. 14B.

FIGS. 14A and 14B are views illustrating an example of a protruding waveguide 122 having a protrusion, of an antenna structure 100 as illustrated in FIG. 6. FIG. 15 is a view illustrating comparison in inter-antenna gap between when a hollow waveguide is applied and when a protruding waveguide is applied. FIG. 16 is a cross-sectional view of FIG. 15.

Referring to FIG. 14A, the protruding waveguide 122 on the upper surface of the conductive lower layer 120 may include a bottom surface 1221, which is positioned lower than the upper surface, side surfaces 1222, which are connected from two opposite ends of the bottom surface 1221 to the upper surface, and a protrusion 1223, which projects upward from a center of the bottom surface 1221. According to an embodiment, the protrusion 1223 may include, or be denoted as, a protruding portion.

According to an embodiment, the upper end of the protrusion 1223 may have a substantially rounded, rectangular, or triangular shape at cross-sectional view.

According to an embodiment, the overall length along the bottom surface 1221 and the outer circumference of the protrusion 1223 may be half the wavelength of the RF signal, or more.

According to an embodiment, the height B of the protrusion 1223 may be larger than the width C of the protrusion 1223 and be larger than half the depth E of the side surface 1222. In FIG. 14A, D denotes the minimum width of the waveguide 122.

According to an embodiment, the gap between the antennas of the transmitter and/or receiver of the vehicle radar may be the half wavelength with respect to the center frequency of the operating frequency. When a bandwidth of about 5 GHz is required as in the vehicle corner radar, the transmitter and/or receiver antennas may be arranged at every 1.91 mm gap, which is the half wavelength, of the center frequency 78.5 GHz between about 76 HGz and about 81 GHz.

In such a case, a slot array antenna using a conventional hollow waveguide (as shown on the left side of FIGS. 14B, 15, and 16) has a waveguide width of about 2.54 mm which is larger than the half wavelength and thus may not be adopted in vehicle corner radars. However, according to an embodiment, a slot array antenna adopting the protruding waveguide 122 may address such issues.

According to an embodiment, the protruding waveguide 122 may reduce the width of the waveguide up to about 1.4 mm (as shown on the right side of FIG. 14B) and thus may apply about 1.91 mm which is the inter-antenna gap of the transmitter and/or receiver required for vehicle corner radars (as shown on the right side of FIG. 15).

The protruding waveguide 122 may reduce the cutoff frequency of the waveguide by including the protrusion 1223 inside a hollow waveguide and may thus be used in the same band as the hollow waveguide, with a smaller waveguide width.

FIGS. 14B, 15, and 16 illustrate a hollow waveguide on the left side and a protruding waveguide on the right side. As an example, even with a smaller inner width, e.g., about 1.4 mm, the protruding waveguide may operate in an about 70 GHz band like the hollow waveguide shown on the left side of FIG. 15. If a hollow waveguide having a width of about 1.4 mm is used, the cutoff frequency of the waveguide of such a structure is about 107 GHz, which falls out of the band of about 76 GHz to about 81 GHz, which is the operating frequency range of the vehicle radar, and thus, the hollow waveguide may not be operated.

In the protruding waveguide 122, it is possible to change the impedance of the waveguide 122 by adjusting the height and width of the inner protrusion 1223. According to an embodiment, the protrusion 1223 has a height of, e.g., 0.8 mm and a width of, e.g., 0.5 mm, implementing a further reduced size.

Hereinafter, a comparative example and an embodiment of the disclosure are described in connection with a state in which the conductive lower layer 120 having the waveguide 122 overlaps the conductive upper layer 130 having the antenna slot pattern 131.

Figure 17A:
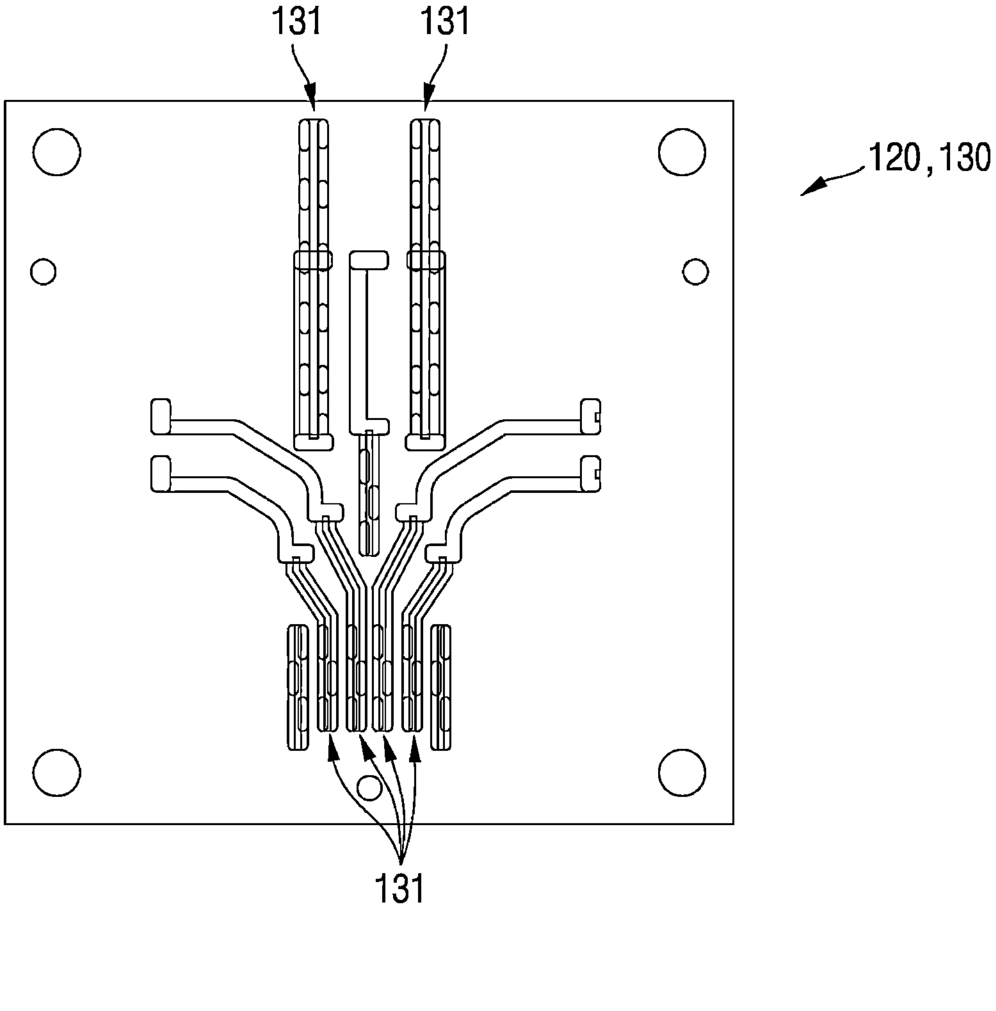
FIG. 17A is a view illustrating an antenna structure for vehicle radar according to a comparative example.
Figure 17B:
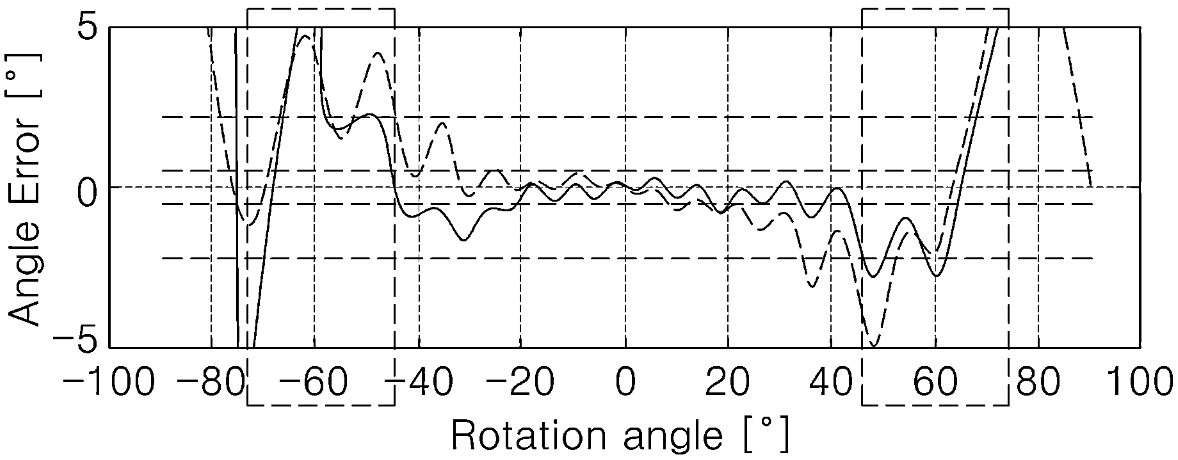
FIG. 17B is a view illustrating signal waveforms including an angle error according to the antenna structure of FIG. 17A.

FIG. 17A is a view illustrating an antenna structure for vehicle radar according to a comparative example. FIG. 17B is a view illustrating signal waveforms including an angle error according to the antenna structure of FIG. 17A.

Referring to FIGS. 17A and 17B, it may be identified that in the antenna structure without such adjacent slot patterns as those of the embodiment of the disclosure, a difference in angle error, of about five degrees or more, occurs from comparison between the solid lines in the range from about 45 degrees to about 75 degrees (see the rectangular boxes in FIG. 17B). Therefore, it may be identified that if the antenna structure of the comparative example is applied to vehicle radar, the accuracy of object detection is very low.

Figure 18A:
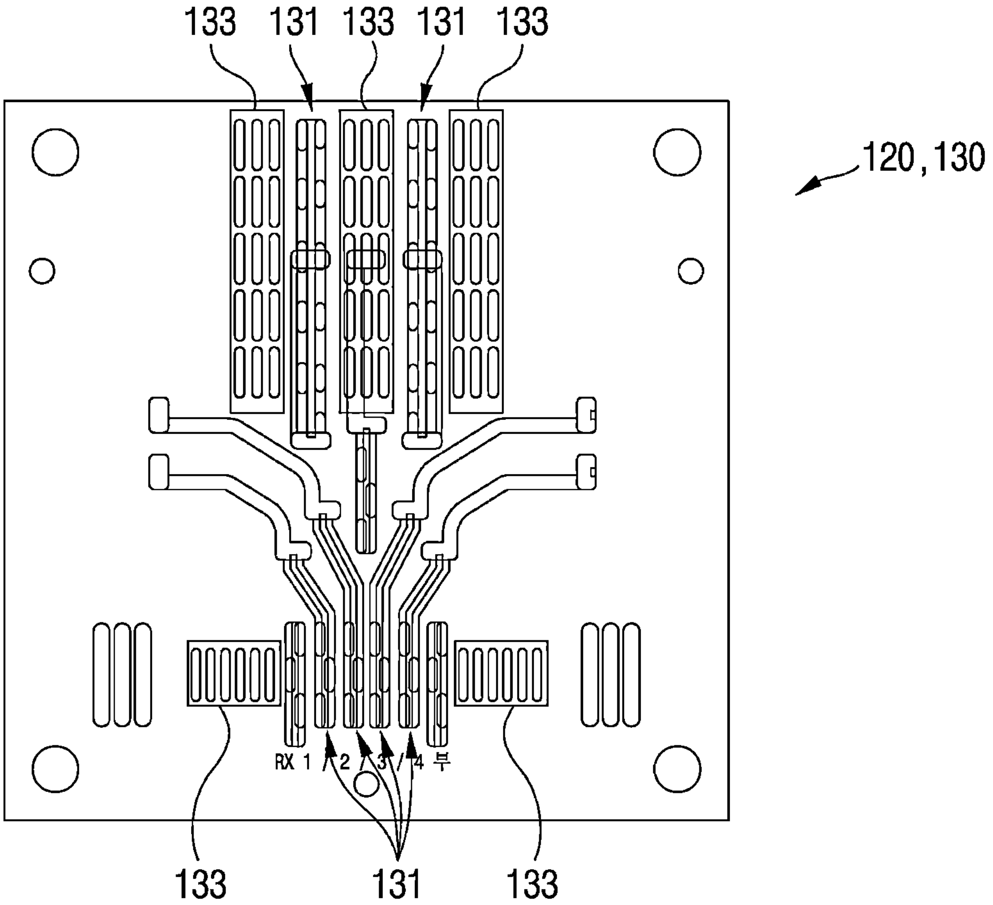
FIG. 18A is a view illustrating an antenna structure according to an embodiment of the disclosure.
Figure 18B:
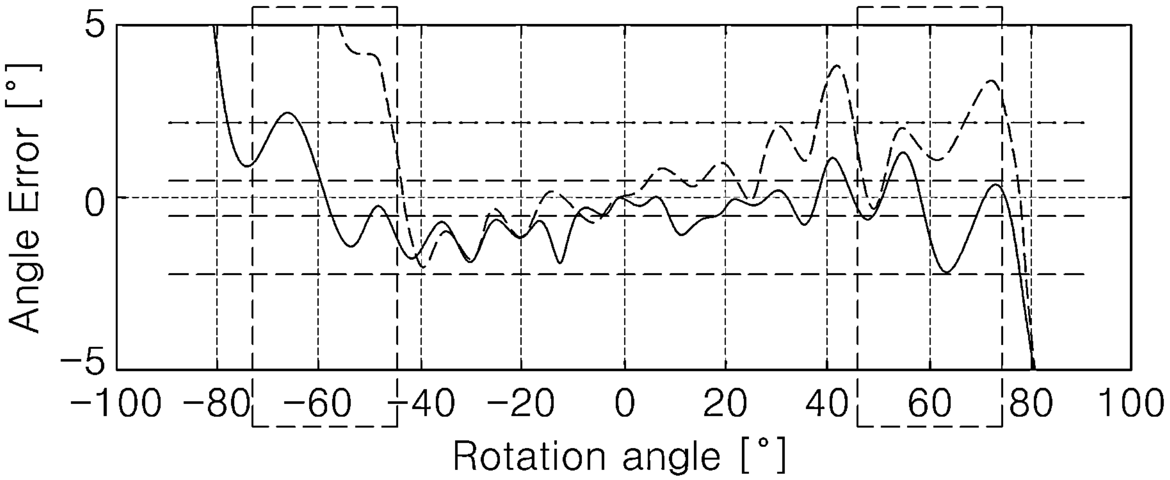
FIG. 18B is a view illustrating signal waveforms including an angle error according to the antenna structure of FIG. 18A.

FIG. 18A is a view illustrating an antenna structure 100 according to an embodiment of the disclosure. FIG. 18B is a view illustrating signal waveforms including an angle error according to the antenna structure of FIG. 18A.

As shown in FIG. 18A, the antenna structure 100 according to an embodiment of the disclosure may further include adjacent slot patterns 133 between the two slot patterns 131 (or slot arrays) and outside the two slot patterns 131 (or slot arrays), which are through holes or blind holes vertically formed in the conductive upper layer 130.

According to an embodiment, the adjacent slot pattern 133 may be/include an adjacent slot array of three columns and five rows of elongated slots. According to an embodiment, the two slot patterns 131 (or slot arrays) provided in an upper area of the conductive upper layer 130 may include, or be denoted as, a first transmission port (or TX1) or a third transmission port (or TX3).

According to an embodiment, the antenna structure 100 may further include adjacent slot patterns 133, which are shaped as elongated blind holes, on two opposite sides of one slot pattern 131 (or slot array) provided in the center of the conductive upper layer 130 (refer to FIG. 8B). The adjacent slot patterns 133 may be arranged substantially in a zig-zag pattern. The one slot pattern 131 (or slot array) provided in the center of the conductive upper layer 130 may include, or be denoted as, a second transmission port (or TX2).

According to an embodiment, the antenna structure 100 may further include adjacent slot patterns 133, which are formed of through holes, on two opposite sides of four slot patterns 131 (or slot arrays) provided in a lower area of the conductive upper layer 130. According to an embodiment, the adjacent slot pattern 133 may include an array of five elongated slots. According to an embodiment, the four slot patterns 131 (or slot arrays) provided in the lower area of the conductive upper layer 130 may include, or be denoted as, first, second, third, and fourth reception ports (or RX1, RX2, RX3, and RX4).

According to an embodiment, the adjacent slot pattern 133 may include, or be denoted as, a soft surface structure and may mitigate or reduce angle errors by reducing the radiation pattern gain deviation for each antenna port (TX1/3, RX1/2/3/4).

It may be identified that in the so-configured antenna structure 100 according to an embodiment of the disclosure, the angle error differences (shown in the rectangular boxes) in the range from about 45 degrees to about 75 degrees fall within about 3 degrees (five degrees or more in the comparative example) from comparison between the solid lines, as shown in FIG. 18B.

Figure 19A:
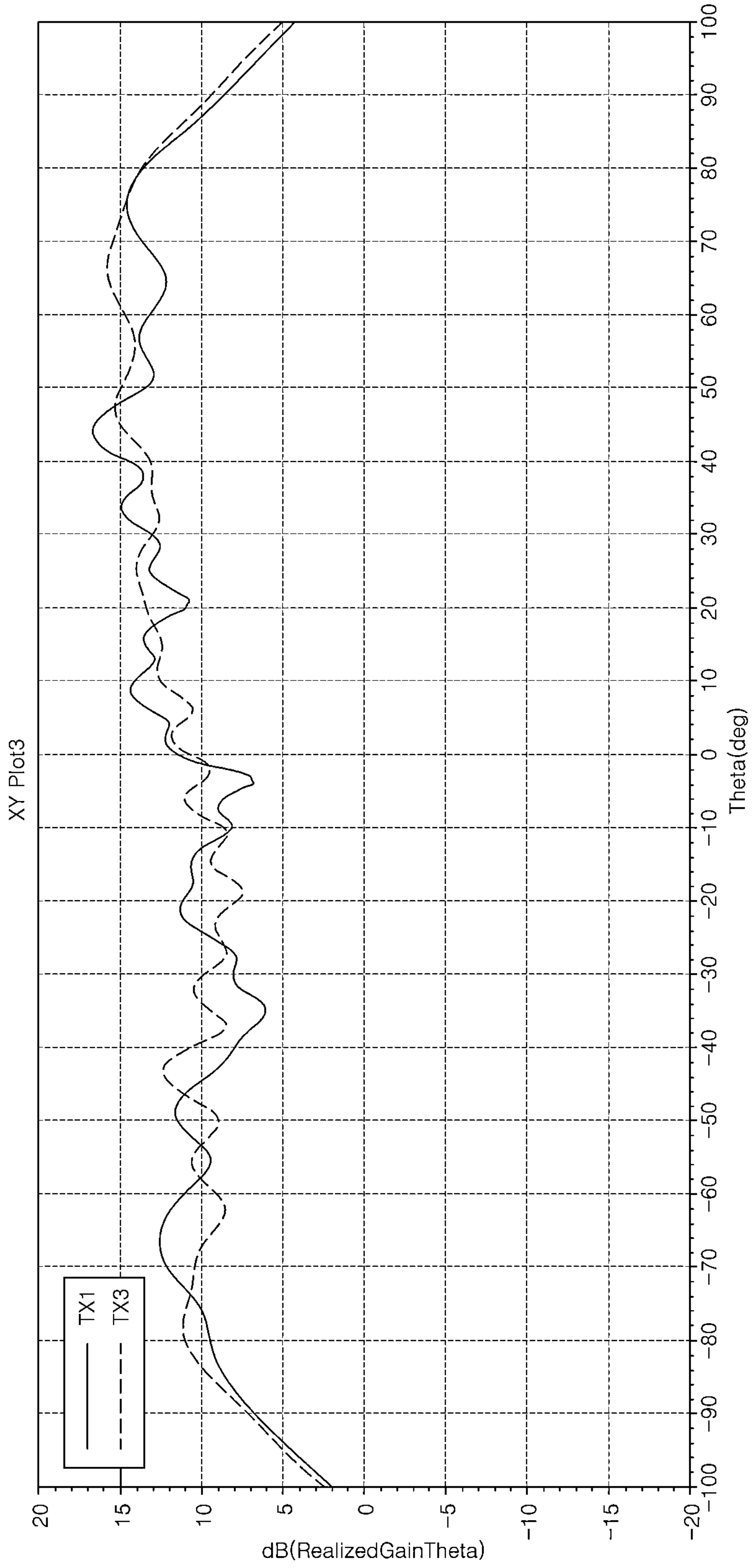
FIG. 19A is a view illustrating TX1/3 radiation patterns before applying the adjacent slot patterns 133.
Figure 19B:
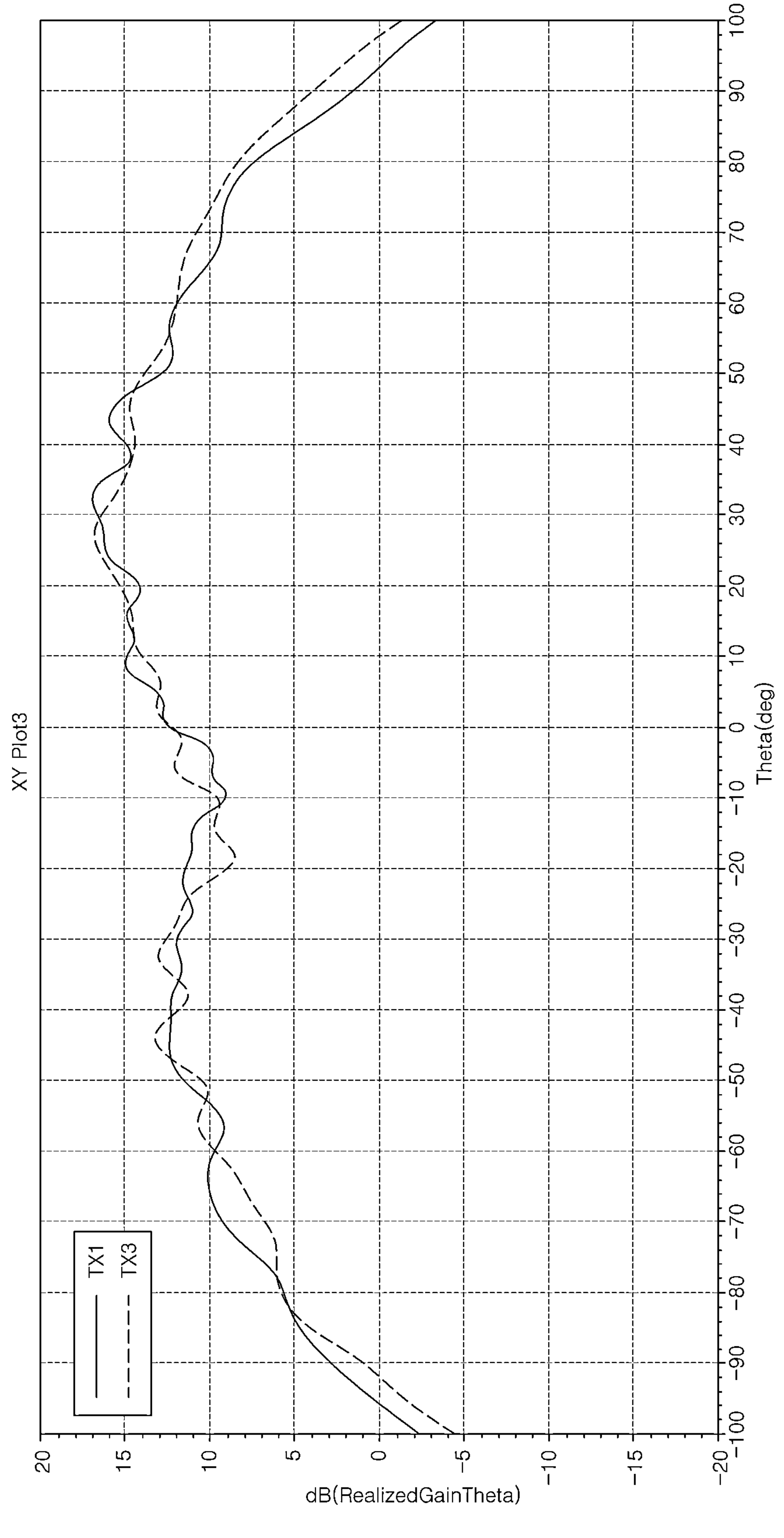
FIG. 19B is a view illustrating TX1/3 radiation patterns after applying the adjacent slot patterns 133.

FIG. 19A is a view illustrating TX1/3 radiation patterns before applying the adjacent slot patterns 133. FIG. 19B is a view illustrating TX1/3 radiation patterns after applying the adjacent slot patterns 133.

Referring to FIGS. 19A and 19B, it may be identified that before applying the adjacent slot patterns 133, the radiation patterns of the transmission ports TX1/3 exhibit a severe gain difference in radiation pattern between the antennas and distortions in beam shape, and transmission port TX1 exhibits more ripples, but after applying the adjacent slot patterns 133, the radiation pattern ripples, distortions, and gain difference reduce.

The adjacent slot patterns 133 applied to the reception ports RX have the same effects and block the lateral waves (surface waves) flowing along the ground surface of the reception port RX1/RX4 antennas to prevent the antenna radiation pattern from tilting toward the ground. Thus, it may be identified that after applying the adjacent slot patterns 133, the reception ports RX1/2/3/4 have similar antenna radiation patterns as compared with before the antenna slot patterns are not applied.

Figure 20A:
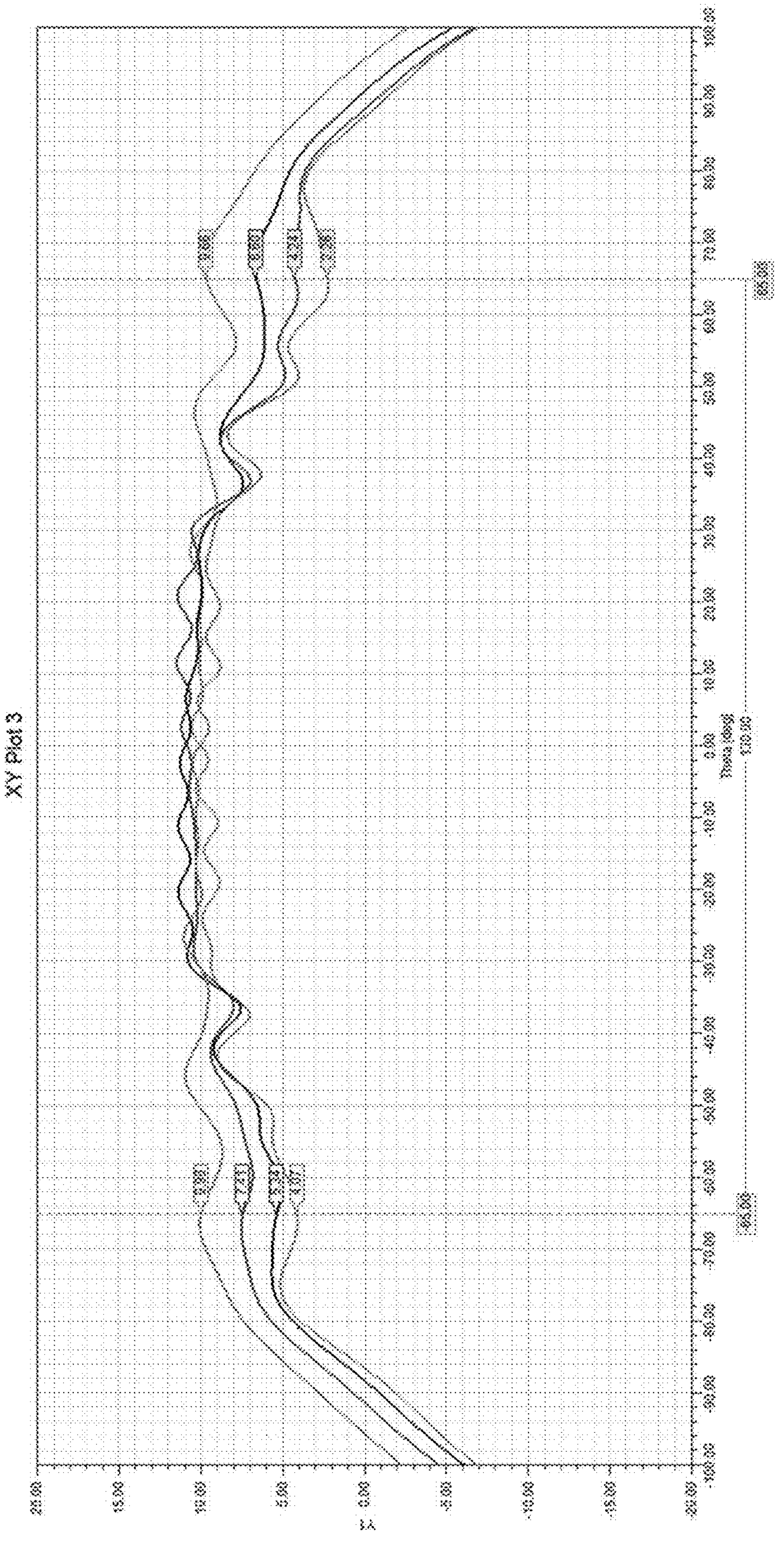
FIG. 20A is a view illustrating RX1/2/3/4 radiation patterns before applying the adjacent slot patterns.
Figure 20B:
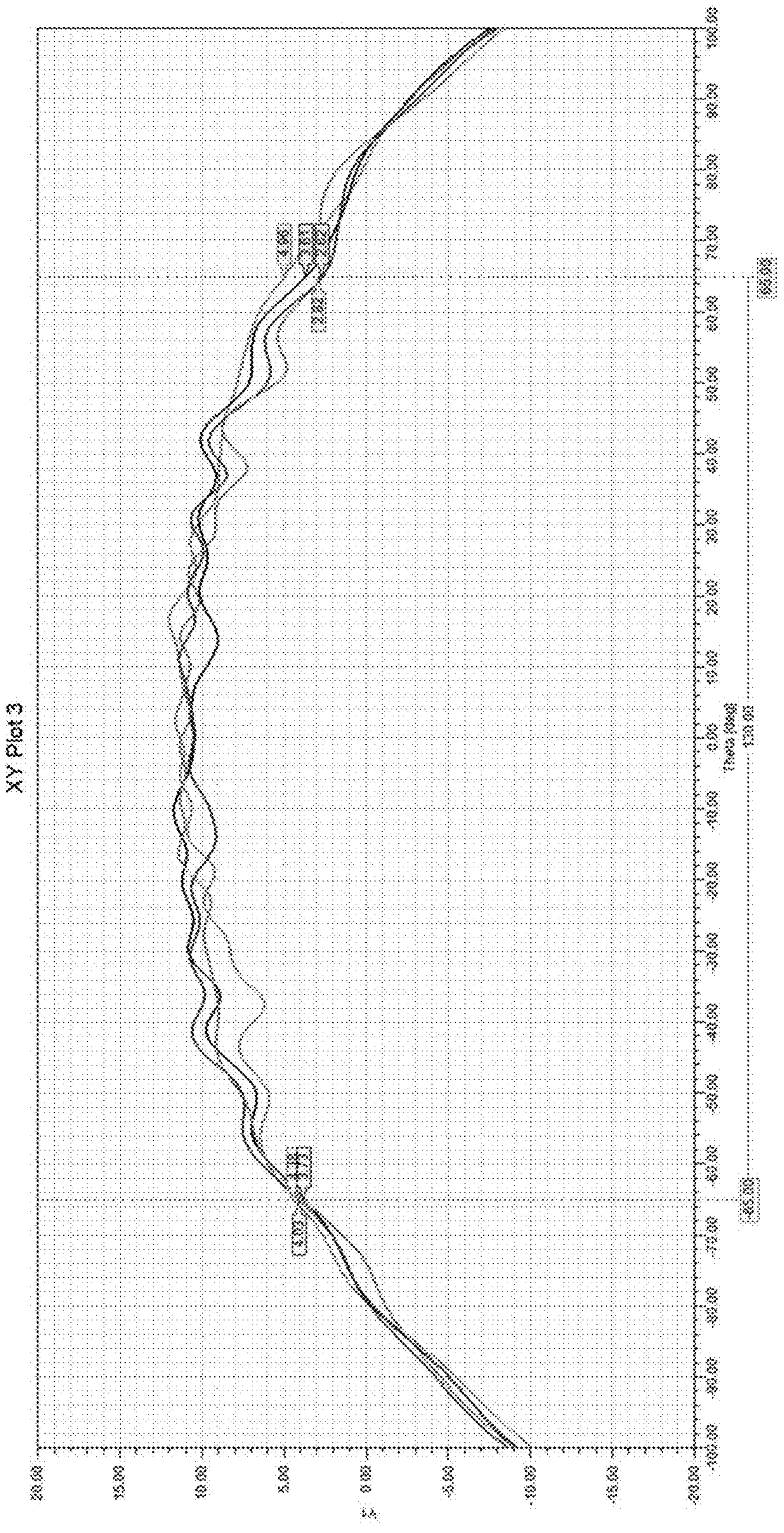
FIG. 20B is a view illustrating RX1/2/3/4 radiation patterns after applying the adjacent slot patterns.

FIG. 20A is a view illustrating RX1/2/3/4 radiation patterns before applying the adjacent slot patterns 133. FIG. 20B is a view illustrating RX1/2/3/4 radiation patterns after applying the adjacent slot patterns 133.

It may be identified from comparison between FIGS. 20A and 20B that the gain deviations (differences) between the radiation patterns of the reception ports RX1/2/3/4 in the marked portion are significantly reduced. It may also be identified that while the maximum deviation before applying the adjacent slot patterns 133 is about 7.4 dB, the maximum deviation is reduced to about 2.3 dB after applying the adjacent slot patterns 133.

The structure of the adjacent slot pattern 133 may have the following design formulas (or equations).

Figure 21:
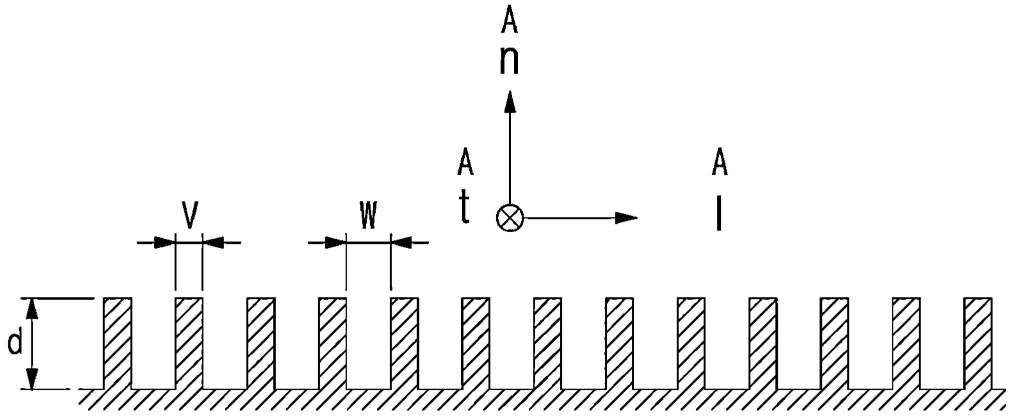
FIG. 21 is a view illustrating a reference pattern in designing the adjacent slot pattern.

FIG. 21 is a view illustrating a reference pattern in designing the adjacent slot pattern 133.

Referring to FIG. 21, by the equation, the height (or depth of the slot) of the adjacent slot pattern 133 may be set to be similar to ¼ wavelength of the center frequency of the operating frequency λ, and the sum of the period and width of the adjacent slot should be much smaller than the half wavelength of the center frequency. The structure of FIG. 21 may be represented as in Equation 1 below.

$$v \ll w+v \ll \lambda/2, d=\lambda/4 \quad \text{[Equation 1]}$$

By using 78.5 GHz as the frequency, w+v«1.91 mm, d=0.955 mm results.

In the structure according to an embodiment of the disclosure, w=0.5 mm/v=0.5 mm/d=1.2 mm, which are minimum measurements possible in manufacture, and as the measurements reduce, more stable operation may be achieved for the adjacent slot pattern 133.

Further, as the length of the adjacent slot pattern 133, the minimum measurement-based achievable length without affecting, e.g., angle errors, may be applied (e.g., about 3.5 mm).

Figure 22:
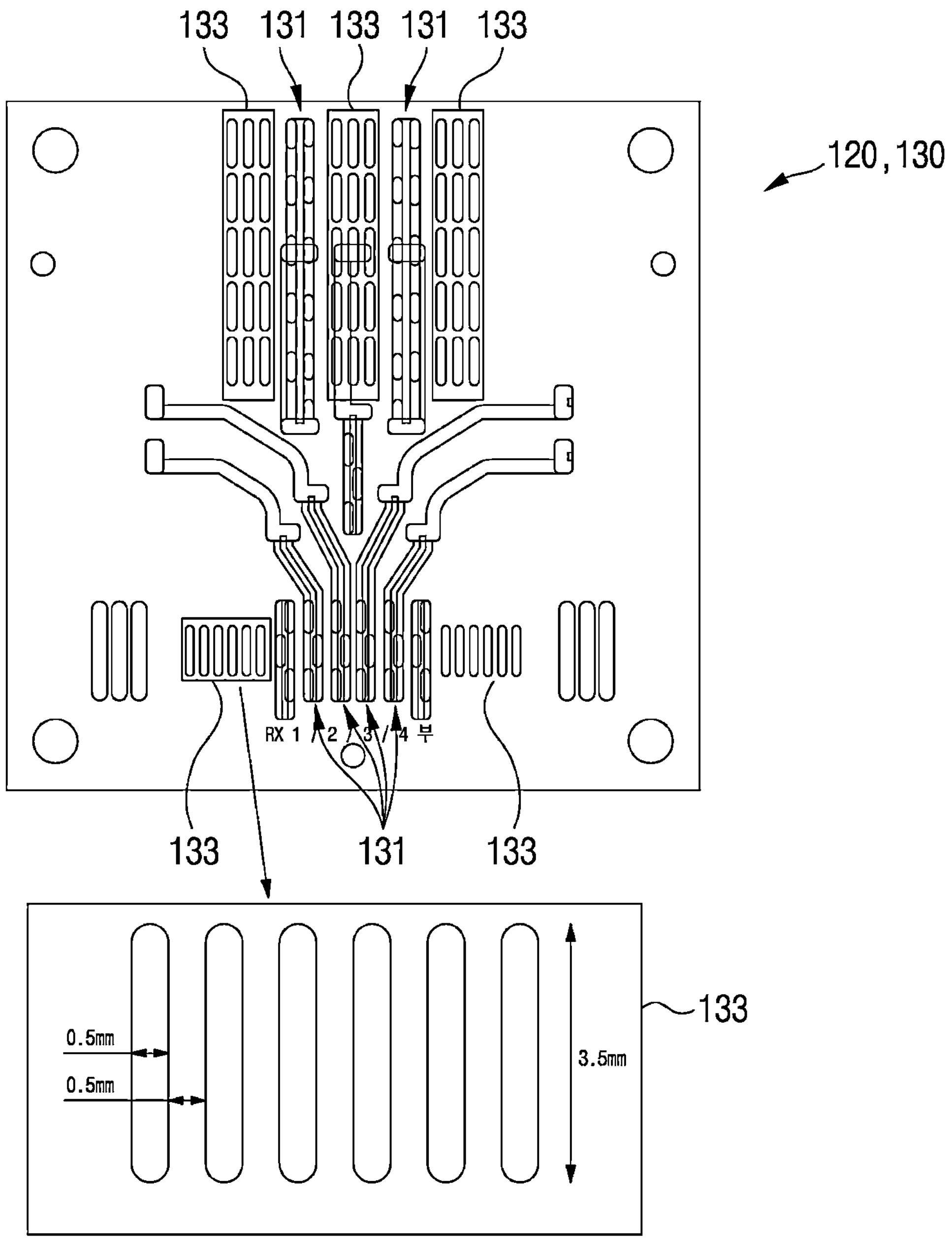
FIG. 22 illustrates an antenna structure and an enlarged view of a portion thereof according to an embodiment of the disclosure.
Figure 23:
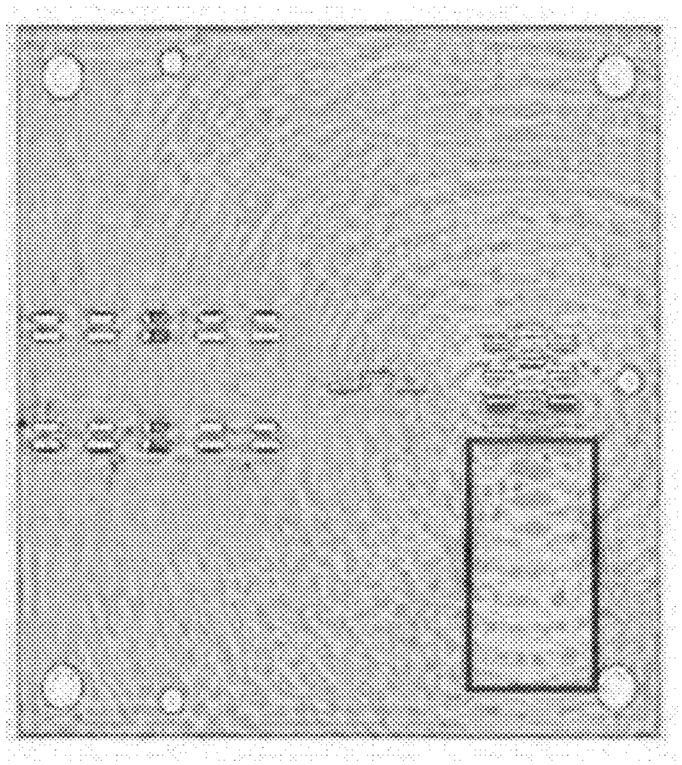
FIG. 23 is a view illustrating a comparison in the magnitude of electric field on an upper surface of an antenna shape according to an embodiment of the disclosure.
Figure 23:
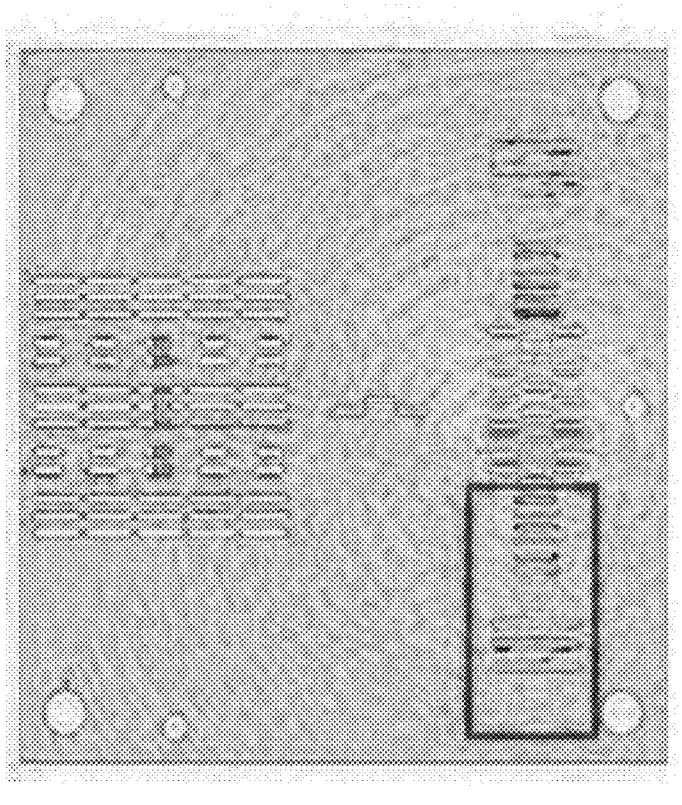

FIG. 22 illustrates an antenna structure 100 and an enlarged view of a portion thereof according to an embodiment of the disclosure. FIG. 23 is a view illustrating a comparison in the magnitude of electric field on an upper surface of an antenna shape according to an embodiment of the disclosure.

Referring to FIGS. 22 and 23, it may be identified that when the adjacent slot pattern 133 is applied, the magnitude of the electric field on the upper surface of the antenna is reduced (refer to the left view of FIG. 23) but, when the adjacent slot pattern 133 is not applied, the magnitude of the electric field on the upper surface of the antenna is not reduced.

As described above, it is possible to provide a per-antenna port gain deviation mitigating structure for enhancing angular resolution, an angle error mitigating structure, and an antenna structure 100 capable of reducing or mitigating angle errors in detecting an object, by providing additional adjacent slot patterns (in the form of through holes or blind holes) around the antenna slot patterns or slot arrays.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments. The scope of the disclosure should be construed by the following claims, and all technical spirits within equivalents thereof should be interpreted to belong to the scope of the disclosure.

What is claimed is:

1. An antenna structure, comprising:

a printed circuit board including an integrated circuit processing a radio frequency (RF) signal, a feeding line connected to the integrated circuit, and a feeding pad connected to the feeding line to transfer the RF signal;

a first conductive layer including an antenna slot pattern connected with the feeding pad through a first waveguide to radiate or receive the RF signal, wherein the first conductive layer further includes an adjacent slot pattern around the antenna slot pattern; and a second conductive layer disposed between the printed circuit board and the first conductive layer, including a feeding hole provided in an area connected with the feeding pad of the printed circuit board and a second waveguide connected to the feeding hole and disposed on the feeding hole, and tightly contacting between the printed circuit board and the first conductive layer.

2. The antenna structure of claim 1, wherein the adjacent slot pattern has a depth of ¼ of a wavelength of the RF signal.

3. The antenna structure of claim 1, wherein the adjacent slot pattern includes a through hole or a blind hole formed vertically.

4. The antenna structure of claim 1, wherein the adjacent slot pattern includes a plurality of slot arrays.

5. The antenna structure of claim 1, wherein the adjacent slot pattern has a depth of 0.5 mm to 1.5 mm and a width and interval of 0.5 mm to 2 mm.

6. The antenna structure of claim 1, wherein the waveguide of the second conductive layer includes a bottom surface positioned lower than an upper surface thereof, a side surface extending from each of two opposite ends of the bottom surface to the upper surface, and a protrusion protruding upward from a center portion of the bottom surface.

* * * * *